US008230232B2

(12) United States Patent
Ahmed et al.

(10) Patent No.: US 8,230,232 B2
(45) Date of Patent: Jul. 24, 2012

(54) SYSTEM AND METHOD FOR DETERMINING A COMPUTER USER PROFILE FROM A MOTION-BASED INPUT DEVICE

(75) Inventors: Ahmed Awad El-Sayed Ahmed, Richmond (CA); Issa Traore, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 656 days.

(21) Appl. No.: 10/555,408

(22) PCT Filed: May 3, 2004

(86) PCT No.: PCT/CA2004/000669
§ 371 (c)(1),
(2), (4) Date: Nov. 1, 2005

(87) PCT Pub. No.: WO2004/097601
PCT Pub. Date: Nov. 11, 2004

(65) Prior Publication Data
US 2006/0224898 A1    Oct. 5, 2006

Related U.S. Application Data

(63) Continuation-in-part of application No. 10/427,810, filed on May 2, 2003, now abandoned.

(51) Int. Cl.
*G06F 21/00* (2006.01)
(52) U.S. Cl. ........................................................ 713/186
(58) Field of Classification Search .................... 713/158
See application file for complete search history.

(56) References Cited

U.S. PATENT DOCUMENTS

| 5,229,764 | A | * | 7/1993 | Matchett et al. | 340/5.52 |
| 5,557,686 | A | * | 9/1996 | Brown et al. | 382/115 |
| 5,596,718 | A | * | 1/1997 | Boebert et al. | 726/16 |
| 5,768,387 | A | * | 6/1998 | Akiyama et al. | 713/182 |
| 7,350,078 | B1 | * | 3/2008 | Odom | 713/176 |
| 2002/0078447 | A1 | * | 6/2002 | Mizutome et al. | 725/37 |
| 2004/0095384 | A1 | | 5/2004 | Avni et al. | |
| 2004/0221171 | A1 | | 11/2004 | Ahmed et al. | |
| 2005/0008148 | A1 | * | 1/2005 | Jacobson | 380/26 |

FOREIGN PATENT DOCUMENTS

| CA | 2415151 | | 1/2003 |
| JP | 7303209 | * | 11/1995 |

(Continued)

OTHER PUBLICATIONS

Monrose et al., "Keystroke dynamics as a biometric for Authentication", Future Generations Computer Systems, Elsevier Science Publishers, 16:351-359 (2000).

(Continued)

*Primary Examiner* — Gilberto Barron, Jr.
*Assistant Examiner* — Simon Kanaan
(74) *Attorney, Agent, or Firm* — Klarquist Sparkman, LLP

(57) ABSTRACT

The present invention provides a system and methods for computer user profiling based on behavioral biometrics. The approach consists of establishing distinctive profiles for computer users based on how they use a motion-based input device such as, but not limited to, a mouse and/or a keyboard. The profiles computed in the present invention are more accurate than those obtained through the traditional statistical profiling techniques, since they are based on distinctive biological characteristics of users.

24 Claims, 22 Drawing Sheets

FOREIGN PATENT DOCUMENTS

JP          2002222051    *    8/2002

OTHER PUBLICATIONS

Figure 1:
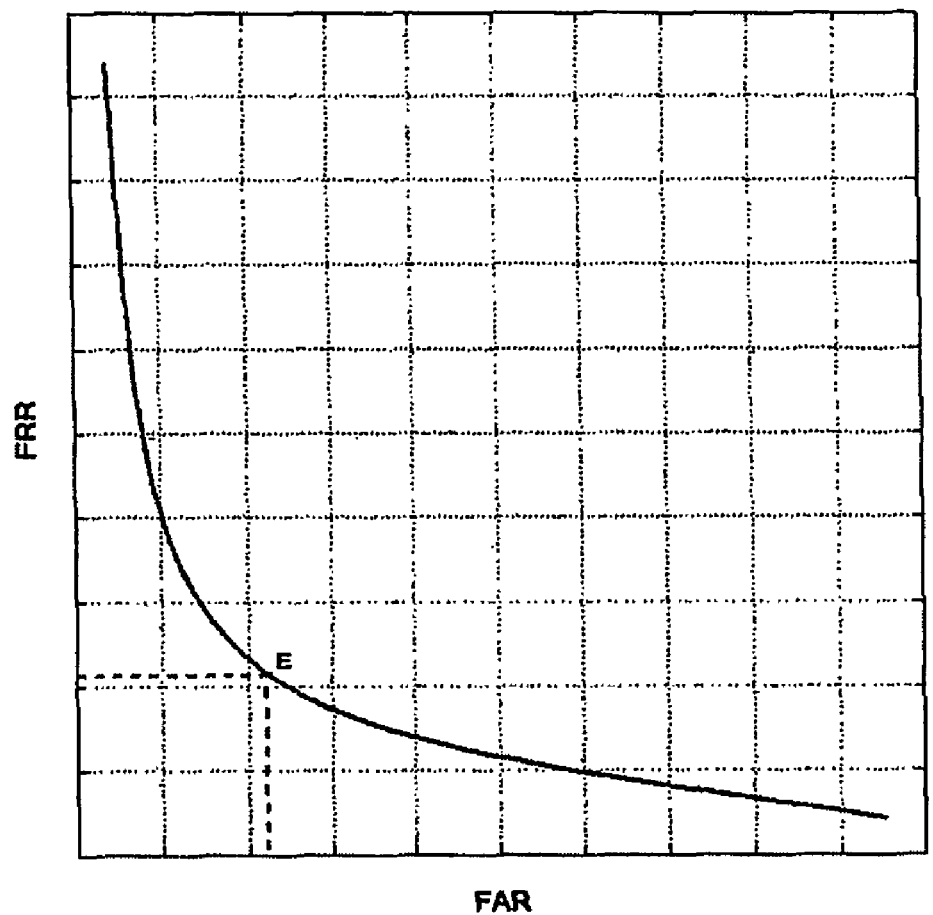

International Search Report for PCT/CA2004/000669, European Patent Office.

Office Action from the Canadian Intellectual Property Office for Canadian Patent Application No. 2,535,542, dated Aug. 15, 2011.
Office Action from the Canadian Intellectual Property Office for Canadian Patent Application No. 2,535,542, dated Sep. 24, 2010.
Office action from the U.S. Patent and Trademark Office in U.S. Appl. No. 10/427,810, dated Jul. 20, 2006.

* cited by examiner (a)

(b)

(a) Approximation Matrix (b) Coverage Matrix

Figure 22

SYSTEM AND METHOD FOR DETERMINING A COMPUTER USER PROFILE FROM A MOTION-BASED INPUT DEVICE

CROSS REFERENCE TO RELATED APPLICATIONS

This application is the U.S. National Stage of International Application No. PCT/CA2004/000669, filed May 3, 2004, which is a continuation-in-part of U.S. patent application Ser. No. 10/427,810, filed May 2, 2003, now abandoned. Both applications are incorporated herein by reference.

FIELD OF THE INVENTION

The invention relates to user profiling of computers based on behavioral biometrics. More specifically, the invention relates to mouse and keystroke-based computer user profiling for security purposes.

BACKGROUND OF THE INVENTION

The increasing reliance of modern societies and economies on computing infrastructures raises the needs of highly secure and dependable computing technologies. Recent widely publicized security incidents such as the slammer worn have established how vulnerable several critical aspects of our social and economical life have become because of increased computerization.

Computer security has also become increasingly important because of the large number of security breaches in individual businesses, and the cost of those breaches to the businesses. In a recent survey (2003), it was reported that the total annual financial losses to the respondents were $201,797,340. This figure could actually be worse since only 251 out of the 530 participants (47%) reported their losses. The survey also shows other compelling statistics: 92% of the respondents detected attacks during the last 12 months while 75% of the respondents acknowledged financial losses due to security breaches. As mentioned above, only 47% reported their losses.

Many organizations address security from three different perspectives: prevention, detection, and reaction. Apparently, 99% of the respondents to a survey use a mixture of various technologies to protect their systems. For example, more than 90% use prevention technologies such as firewall, access control, and physical security. Also, 73% use intrusion detection systems.

One form of protection is password protection. It is a well-established fact that traditional passwords are not safe anymore. Passwords may be stolen or may be cracked using the so-called dictionary attack.

Another technology used by corporations to protect their networks is firewalls. Firewall technology has been used to protect and isolate segments of networks from untrusted networks by filtering out harmful traffic. There are several limitations to firewall technologies that result in them being relatively poor choices for strong network protection. There have been several widely publicized exploits whereby hackers have gained access to sensitive data by tunneling through authorized protocols. In order to provide a higher level of security, most organizations combine firewalls with a range of security monitoring tools called intrusion detection systems (IDS).

Intrusion Detection

The role of IDS is to monitor and detect computer and network intrusions in order to take appropriate measures that would prevent or avoid the consequences. The Internet is a wild zone, where new forms of security attacks are developed and executed daily. Hence, the main challenge currently faced by IDS technology is to be able to detect new forms of attacks.

An intrusion is described as a violation of the security policy of the system. It is also described as any set of actions that attempt to compromise the integrity, confidentiality, or availability of a resource.

There are three types of intrusion detection systems, anomaly intrusion detection, misuse intrusion detection, and specification based detection. Anomaly detection refers to intrusions that can be detected based on anomalous activity and use of resources. Misuse detection refers to intrusions that follow well defined patterns of attack. Specification-based detection approaches consider that all well-behaved system executions shall conform precisely to programs specifications Existing anomaly detection techniques attempt to establish normal activity profile using statistical modeling. Statistical profile-based detection uses a set of metrics to compute some measurements of user activity, and compares them against a set of values that characterize normal user activity. Any discrepancy between the computed values and the expected ones is considered an intrusion. Anomaly detection techniques to date rely upon a measured activity. These tend to be an activity in response to an input and therefore rely very heavily upon the constancy of the input. For example, the number of emails opened in a day may be measured. This, of course is highly dependent upon the number of emails received.

Anomaly detection techniques assume that all intrusive activities are necessarily anomalous. This means that if we could establish a normal activity profile for a system, we could, in theory, flag all system states varying from the established profile by statistically significant amounts as intrusion attempts. However, if we consider that the set of intrusive activities only intersects the set of anomalous activities instead of being exactly the same, we will find the following possibilities:

1. Anomalous activities that are not intrusive are flagged as intrusive. (false positives); and
2. Intrusive activities that are not anomalous (false negatives)

False negatives are considered very dangerous, and are far more serious than the issue raised by false positives.

The main issues in existing anomaly detection systems are the selection of threshold levels so that neither of the above two problems is unreasonably magnified, and the selection of available features to monitor. The features should effectively discriminate between intrusive and non intrusive behaviors. The existing anomaly detection systems are also computationally expensive because of the overhead of keeping track of, and possibly updating several system profile metrics.

The concept behind misuse detection schemes is that there are ways to represent attacks in the form of a pattern or a signature so that even variations of the same attack can be detected. Misuse detection systems can detect many or all known attack patterns, but they are of little use for as yet unknown attack methods.

Specification-based intrusion detection consists of checking whether a certain execution sequence violates the specification of programs that may affect the system protection state. Specification-based detection has the potential to detect unknown attacks, however it is still in its infancy.

Existing intrusion detectors are characterized by significantly high false alarm rates. This is mainly a result of the low accuracy of the profiles computed. For example, some anomaly detectors base users' profiles on metrics such as the average number of files opened or emails sent daily. It is easy to find several users sharing the same habits. Further, it is easy for any user to change his habits and adopts the usage pattern of other users!

Biometrics Systems:

Different types of biometrics identification systems are currently available in the market, and are widely used in various security applications. Biometrics can be classified into two categories, "physiological biometrics" and "behavioral biometrics". Physiological biometrics, including finger-scan, iris-scan, retina-scan, hand-scan, and facial-scan uses measurements from the human body. Behavioral biometrics, such as signature or keystroke dynamics, uses measurements based on human actions. Published benchmark testing data for existing technologies shows that false rejection rates vary from 6% for face recognition to 0.25% for iris scan, whereas false acceptance rates vary from 6% for face recognition to 0.0001% for iris scan. Behavioral biometrics systems have experienced less success when compared to physiological systems because of variability in the measured parameter over time. However, either system provides improvements over the traditional intrusion detection systems.

Traditional intrusion detection systems focus on the actions conducted by the user. Biometrics-based systems focus on the identity of the user, hence such systems are able to detect the type of intrusion where an attacker gains access to the resources and starts to perform normal non-intrusive procedures, causing information leakage or any other vulnerabilities. Differences in usage pattern cannot be detected by traditional intrusion detection systems if the attacker knows the operation sequences and his access limits. Such an attack, however, can be uncovered if the detection is based on biometrics information.

In recent years there has been increasing interest in biometrics systems. The Oxford dictionary definition of biometrics is "application of statistical analysis to biological data". In the field of computer security, biometrics is defined as the automated use of a collection of factors describing human behavioral or physiological characteristics to establish or verify a precise.

Biometrics systems operate in two modes, the enrollment mode and the verification/identification mode. In the first mode, biometrics data is acquired using a user interface or a capturing device, such as a fingerprints scanner. Raw biometrics data is then processed to extract the biometrics features representing the characteristics that can be used to distinguish between different users. This conversion process produces a processed biometrics identification sample, that is stored in a database for future identification/verification needs. Enrolled data should be free of noise and any other defects that can affect its comparison to other samples. In the second mode, biometrics data is captured, processed and compared against the stored enrolled sample. According to the type of application, a verification or identification process will be conducted on the processed sample.

The verification process conducts one-to-one matching by comparing the processed sample against the enrolled sample of the same user. For example, a user is authenticated at login by declaring his identity by entering his login name. He then confirms his identity by providing a password and biometrics information, such as his signature, voice password, or fingerprint. To verify the identity, the system will compare the user's biometrics data against his record in the database, resulting with a match or non-match. The identification process matches the processed sample against a large number of enrolled samples by conducting a 1 to N matching to identify the user resulting in an identified user or a non-match.

Regardless of the biometrics system employed, the following metrics must be computed to determine the accuracy of the system:

1. False Acceptance Rate (FAR), the ratio between the number of occurrences of accepting a non-authorized user compared to the number of access trials.
2. False Rejection Rate (FRR), the ratio between the number of false alarms caused by rejecting an authorized user compared to the number of access trials.
3. Failure to Enroll (FTE), the ratio characterizing the number of times the system is not able to enroll a user's biometrics features; this failure is caused by poor quality samples during enrollment mode.
4. Failure to Capture (FTC), the ratio characterizing the number of times the system is not able to process the captured raw biometrics data and extract features from it; this occurs when the captured data does not contain sufficient information to be processed.

FAR and FRR values can vary significantly depending on the sensitivity of the biometrics data comparison algorithm used in the verification/identification mode; FTE and FTC represent the sensitivity of the raw data processing module.

In order to tune the accuracy of the system to its optimum value, it is important to study the effect of each factor on the other. FIG. 1 shows the relation between FAR and FRR for a typical biometrics system. If the system is designed to minimize FAR to make the system more secure, FRR will increase. On the other hand, if the system is designed to decrease FRR by increasing the tolerance to input variations and noise, FAR will increase. For the system indicated in FIG. 1, the point E where FAR and FRR reach approximately low equal values, represents the optimum tuning for this system.

The utilization of biometrics technology has been limited to identity verification in authentication and access control systems. Hence, important security applications such as intrusion detection systems have been left out of this technology. There are two reasons for this. First, most biometrics systems require special hardware device for biometrics data collection and this restricts their use to networks segments that provide them. This makes the systems irrelevant for a significant number of remote users, who operate outside of these network segments. Second, most biometrics systems require active involvement of the user who is asked to provide data samples that can be used to verify h is id entity. This excludes the possibility of passive monitoring, which is essential for intrusion detection. There are also a number of secondary obstacles to the use of biometrics for intrusion detection such as whether the technology allows dynamic monitoring, or real-time detection.

Keystroke Dynamic Biometrics:

A popular biometrics system that escapes some of the limitations of behavioral biometrics is keystroke dynamics biometrics. Keystroke dynamics doesn't require special hardware for data collection (a regular keyboard is enough). Under certain circumstances it can be used for dynamic monitoring. The traditional keystroke technology, however, doesn't allow passive monitoring as the user is required to type a predefined word or set of words that is used to identify him. The dwell time and the flight time for keyboard actions is then measured. Thereafter, a set of so-called digraphs, tri-graphs or n-graphs is constructed and analyzed to produce a distinctive pattern. User authentication and classification are the most suitable applications for such technology.

Mouse Dynamic Biometrics:

Previous work on mouse dynamics have, so far, been limited to user interface design improvement. Studies have been conducted to establish the applicability of Fitts' law in predicting the duration of a movement to a target based on the size of the target and the distance from the starting point to the target. According to Fitts' law, the mean movement time for a movement with distance A to a target with width W is as follows:

MT=a+b($\log_2$(2A/W)) where a and b are empirically determined parameters.

In experiments focused on graphical user interface design mouse cursor movements were measured to assess psychological responses in patients. A specific user interface was used to force the user to do specific movements. The user was asked to move the mouse from specific point approaching a specific object located at a certain distance. The study took into consideration the effect of movement direction and the object size. The study allowed the understanding of several user interface properties related to the shape, size, location, and preferred angle of approach of the target object.

It is an objective of the invention to overcome the deficiencies of the prior art.

SUMMARY OF THE INVENTION

The present invention provides a system and methods for computer user profiling based on behavioral biometrics. The approach consists of establishing distinctive profiles for computer users based on how they use a motion-based input device such as, but not limited to, a mouse and/or a keyboard. The profiles computed in the present invention are more accurate than those obtained through the traditional statistical profiling techniques, since they are based on distinctive biological characteristics of users.

The present invention allows passive, dynamic, and real-time monitoring of users without the need for special hardware—it simply requires a motion-based input device, such as a standard computer mouse or keyboard for data collection. Mouse and keystroke dynamics biometrics are two related technologies, that complement each other.

In one embodiment of the invention, a behavioral biometrics-based user verification system for use with a motion-based input device is provided. The system comprises a data interception unit for receiving inputs from a user, a behavior analysis unit operatively coupled to the data interception unit, and a behavior comparison unit operatively coupled to the behavior analysis unit. The system translates behavioral biometrics information into representative data, stores and compares different results, and outputs a user identity result.

In one aspect of the invention, the user verification is suitably configured for dynamic monitoring.

In another aspect of the invention, the user verification is suitably configured for passive data collection.

In another aspect of the invention, the user verification system is suitably configured for real-time monitoring.

In another aspect of the invention, the user verification further comprises secure communication protocols operatively coupled to the data interception unit.

In another aspect of the invention, the user verification system the data interception unit is configured to identify data from a mouse as one of movement, drag and drop, point and click, and silence, such that in use, the system receives data from a mouse.

In another aspect of the invention, the user verification system the data interception unit is further configured to characterize movement based on at least one of average speed, average traveled distance, and direction of movement.

In another embodiment of the invention, the data interception unit is configured to identify actions from a keyboard on the basis of dwell time and flight time such that in use, the system receives data from a keyboard.

In another aspect of the invention, data interception unit is further configured to identify action from a mouse as one of movement, drag and drop, point and click, and silence, such that in use, the system receives data from a mouse and from a keyboard.

In another aspect of the invention, the data interception unit is further configured to characterize mouse movement based on at least one of average speed, average traveled distance, and direction of movement.

In another embodiment of the invention, a method of characterizing a user comprises the steps of moving a motion-based input device, collecting data from the device, processing the data, and modeling the data using suitably selected algorithms to develop a signature for a user.

In one aspect of the invention, the method further comprises comparing the signature with a signature of an authorized user.

In another aspect of the invention, the method further comprises filtering the data after processing and before modeling to reduce noise.

In another aspect of the invention, the method further comprises passively collecting data.

In another aspect of the invention, the method further comprises collecting, processing and modeling the data in real-time.

In another aspect of the invention, the method is further characterized as moving a mouse, collecting data from the mouse, processing the data, and modeling the data using suitably selected algorithms to develop a signature for a user.

In another aspect of the invention, the collecting data further comprises characterizing movement based on at least one of average speed, average traveled distance, and direction of movement.

In another embodiment of the invention the method is further characterized as using a keyboard, collecting data from the keyboard, processing the data, and modeling the data using suitably selected algorithms to develop a signature for a user.

In one aspect of the invention, the collecting data is further comprises characterizing movement based on flight time and dwell time.

In another aspect of the invention, the method further comprises collecting data from a mouse, processing the data and modeling the data using suitably selected algorithms to develop a signature for a user based on both mouse and keyboard data.

In another aspect of the invention, the collecting data further comprises characterizing movement based on at least one of average speed, average traveled distance, and direction of movement.

LIST OF FIGURES

The invention will be better understood with reference to the following figures:

FIG. 1. Tuning the system for best accuracy by studying the relation between FAR and FRR.

Figure 2:
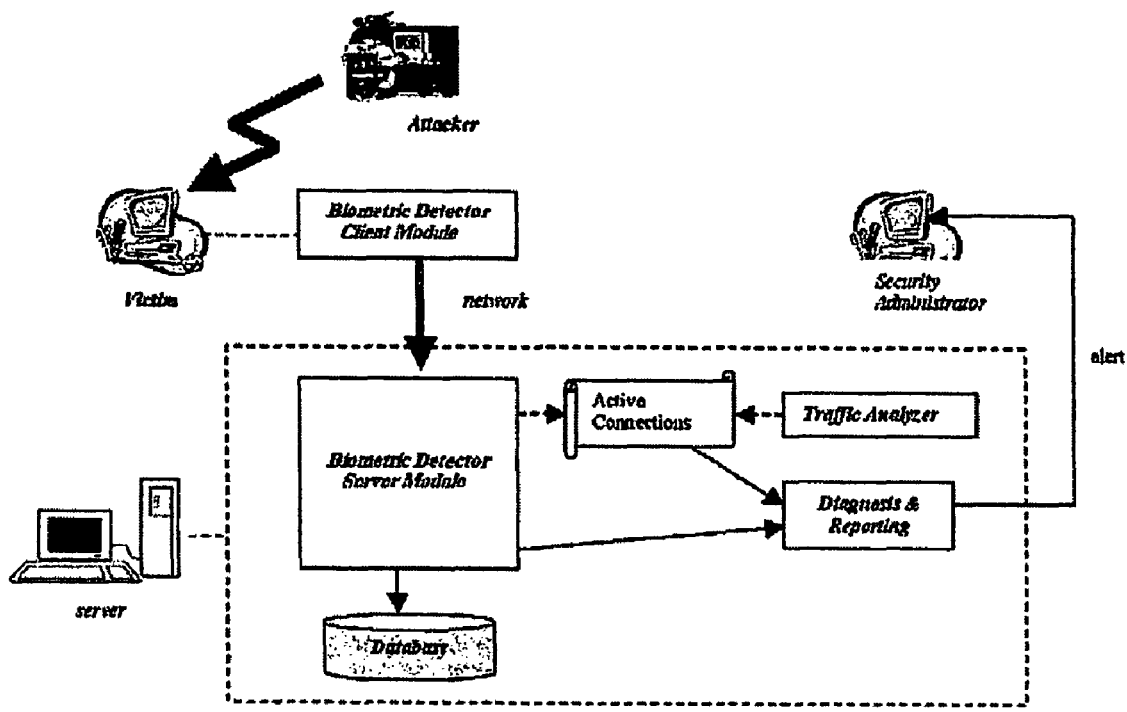

FIG. 2: Detector architecture in accordance with an embodiment of the invention.

Figure 3:
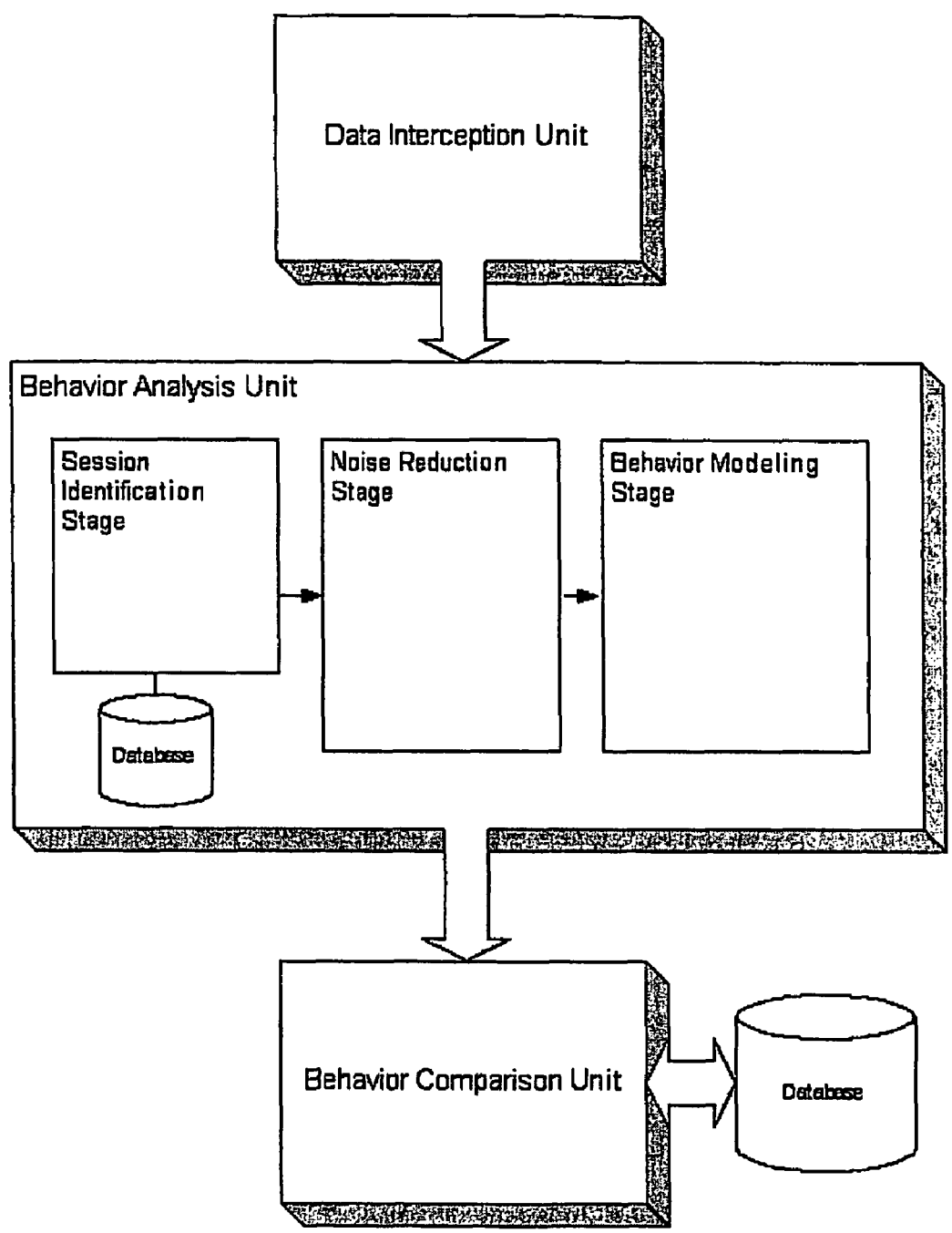

FIG. 3. Mouse dynamics detector architecture in accordance with an embodiment of the invention.

Figure 4:
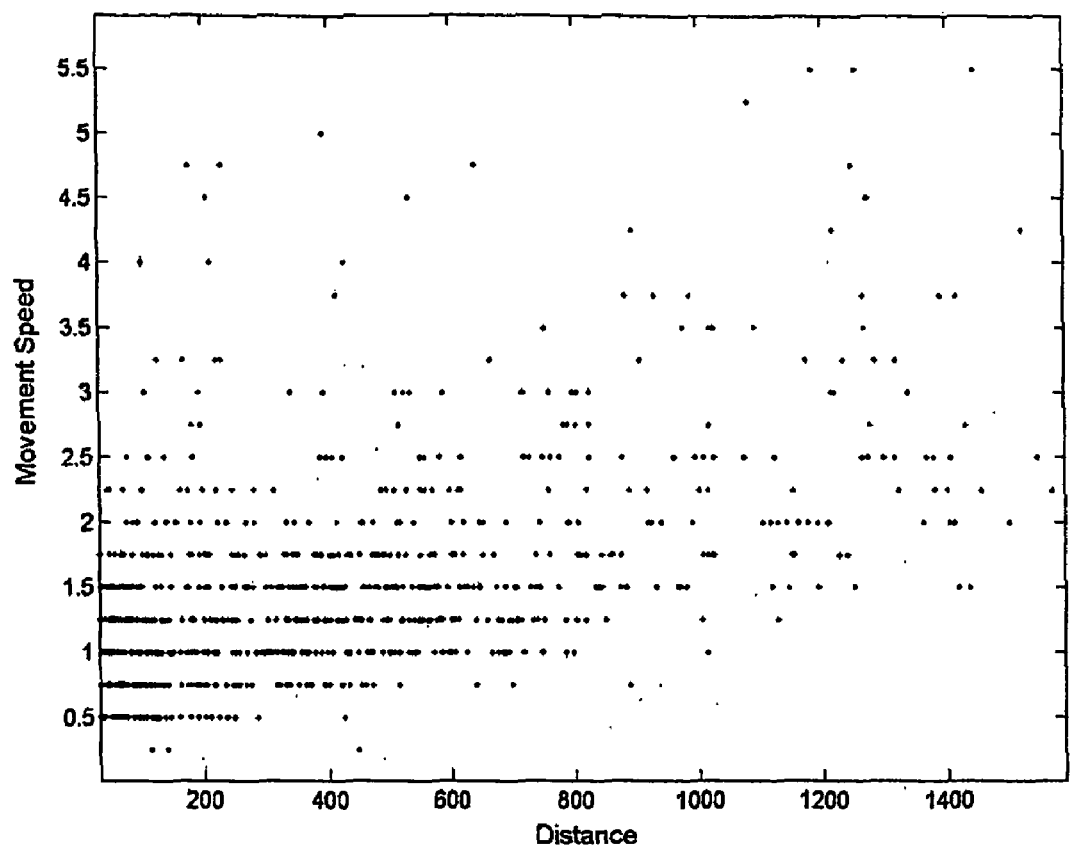

FIG. 4. Example of data generated from the interception unit.

Figure 5:
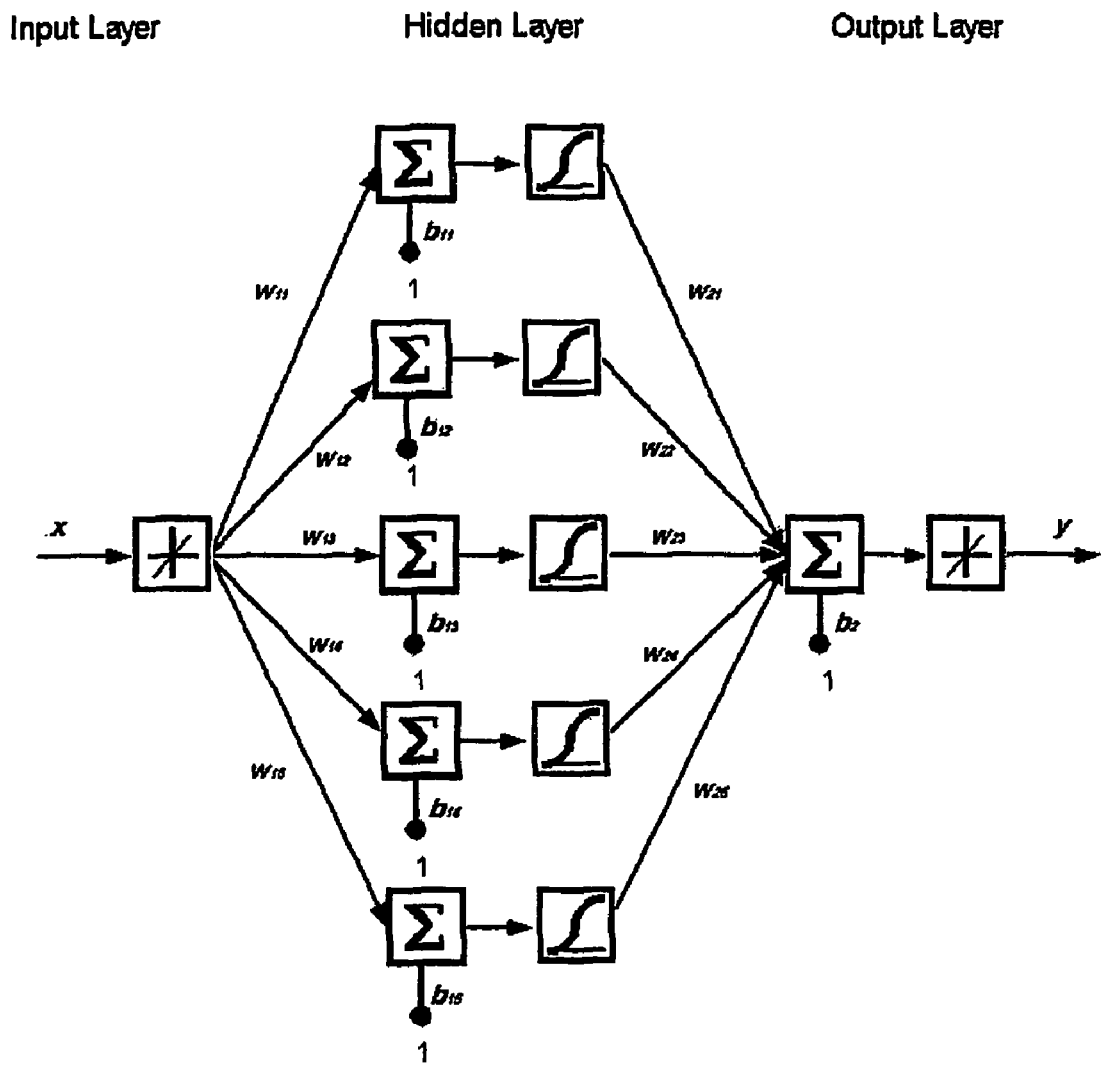

FIG. 5. Neural network used in the behavior modeling stage.

Figure 6:
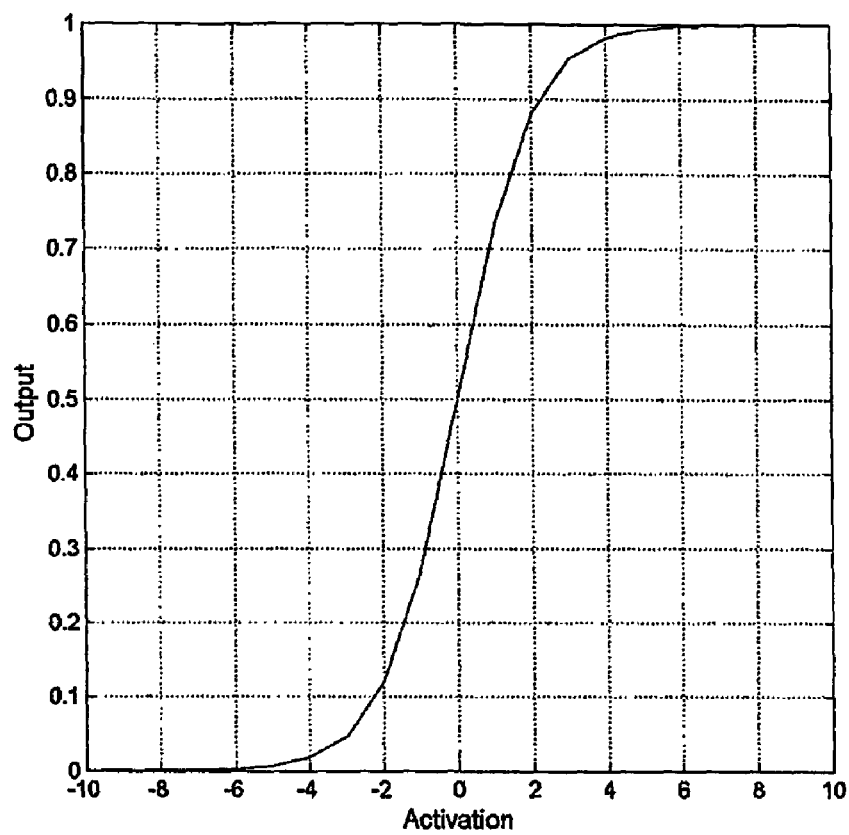

FIG. 6. The log-sigmoid transfer function.

Figure 7:
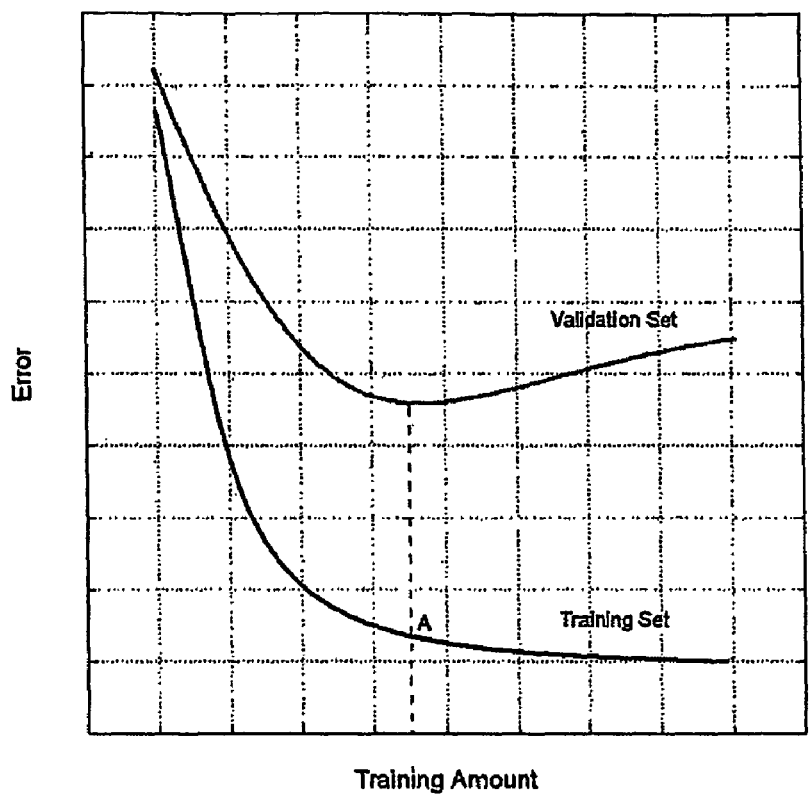

FIG. 7. Determining the training stop point for curve approximation neural network.

Figure 8:
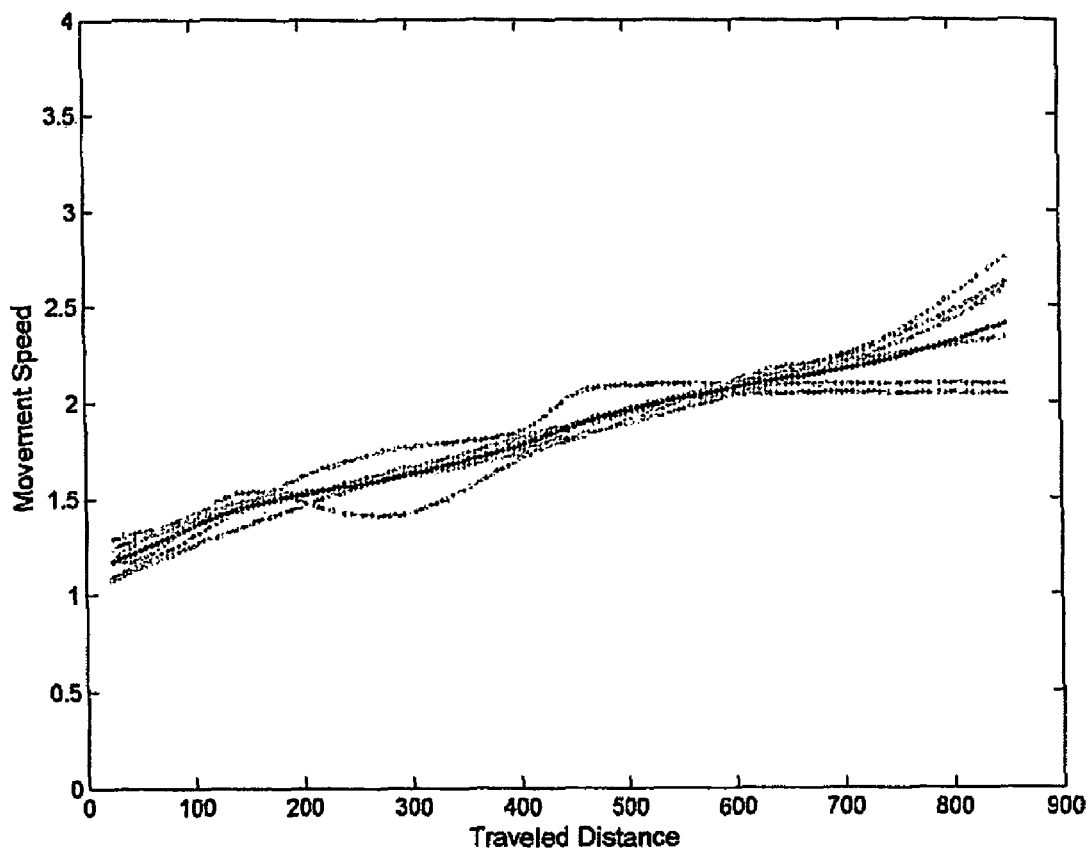

FIG. 8. Mouse signature reproducibility.

Figure 9:
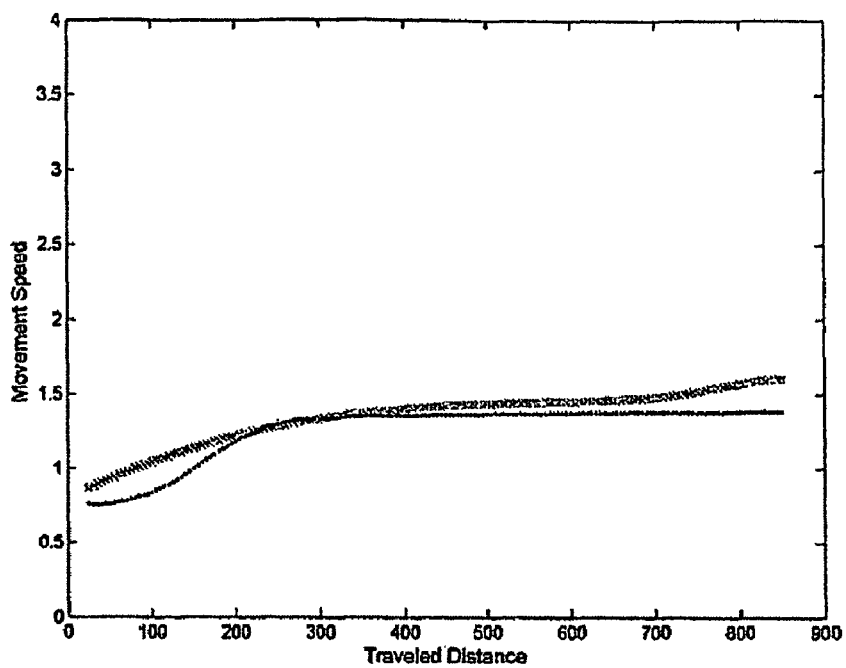
Figure 9:
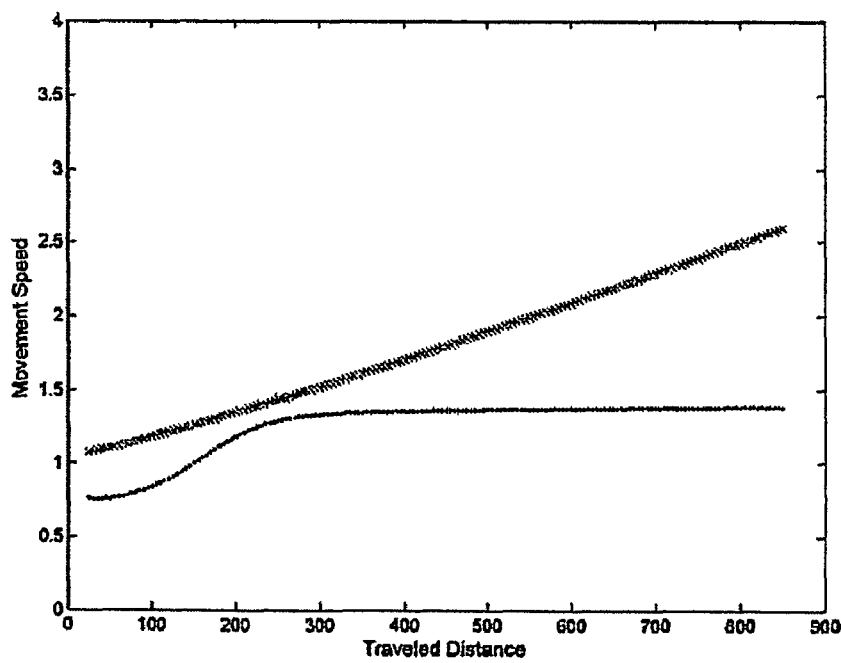

FIG. 9. Comparing mouse signatures.

Figure 10:
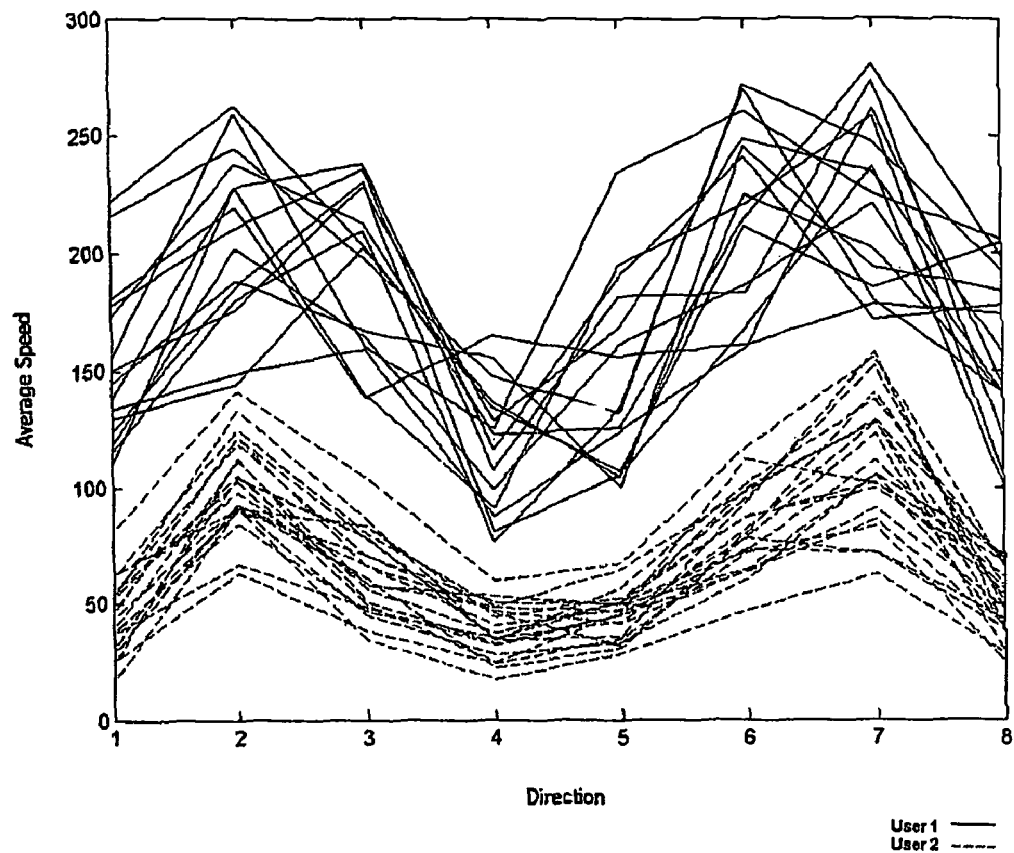

FIG. 10. Average speed for different movement directions.

Figure 11:
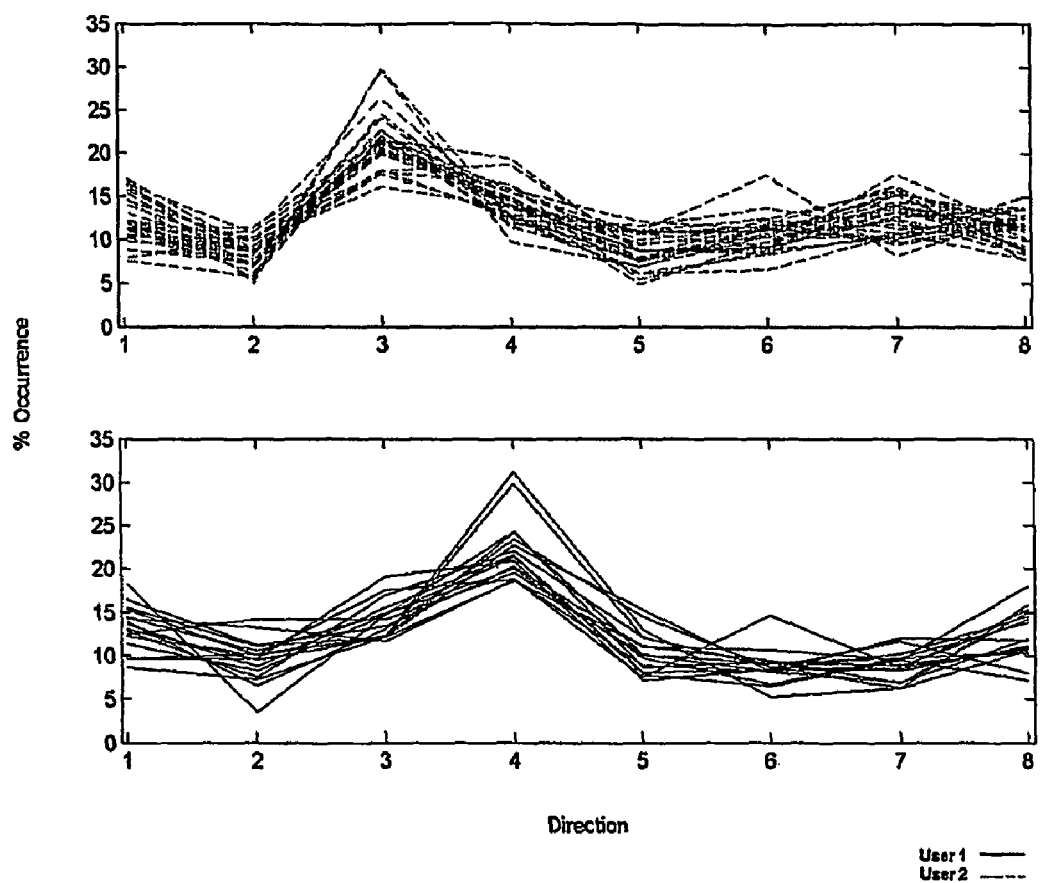

FIG. 11. Histogram of the directions of movement.

Figure 12:
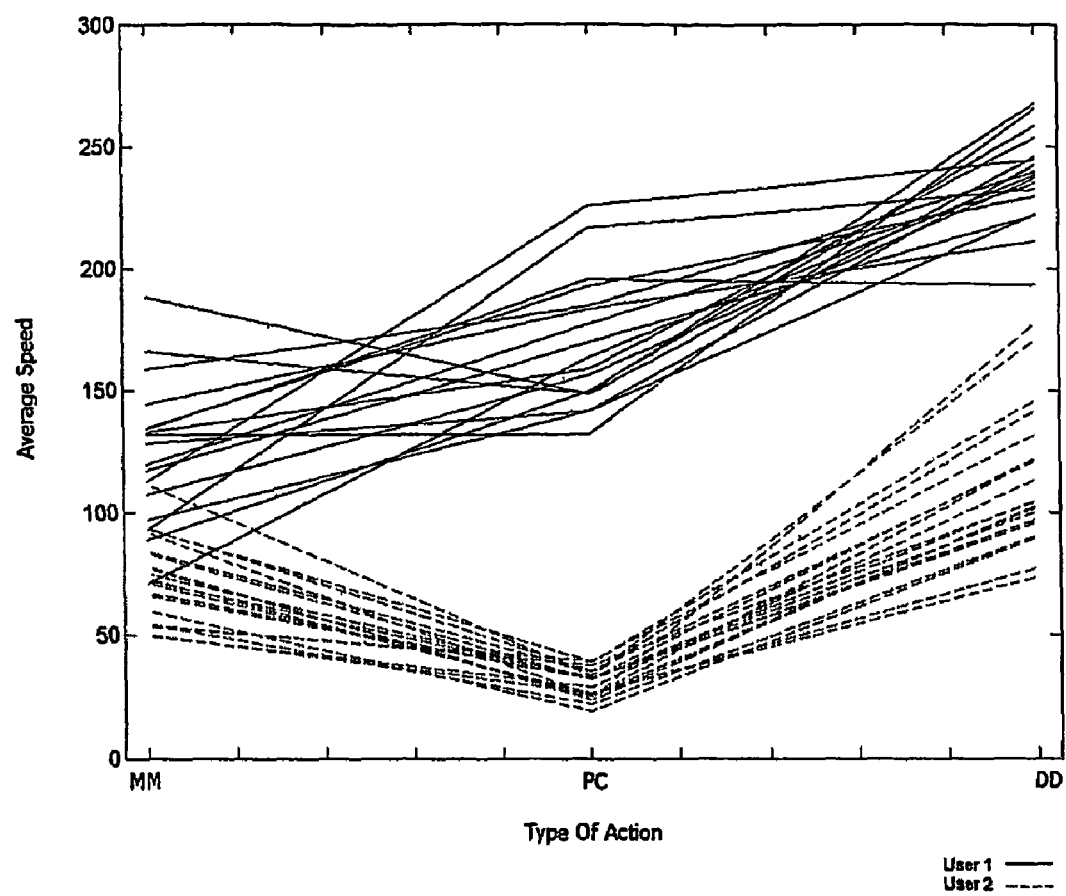

FIG. 12. Average speed for different types of actions.

Figure 13:
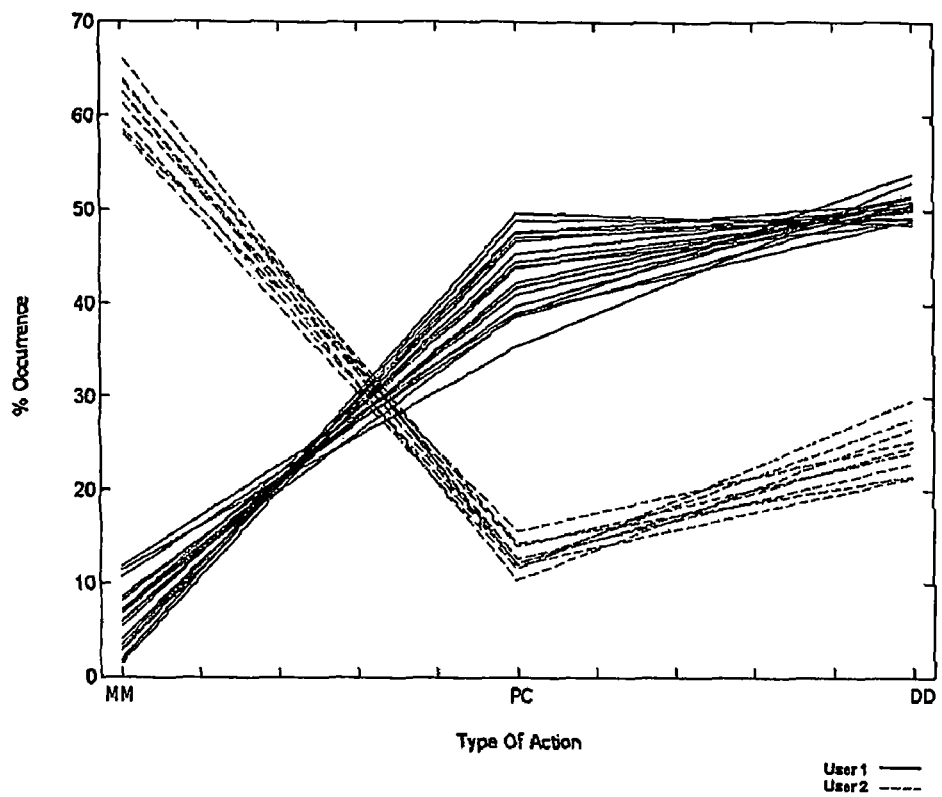

FIG. 13. Histogram of the types of actions.

Figure 14:
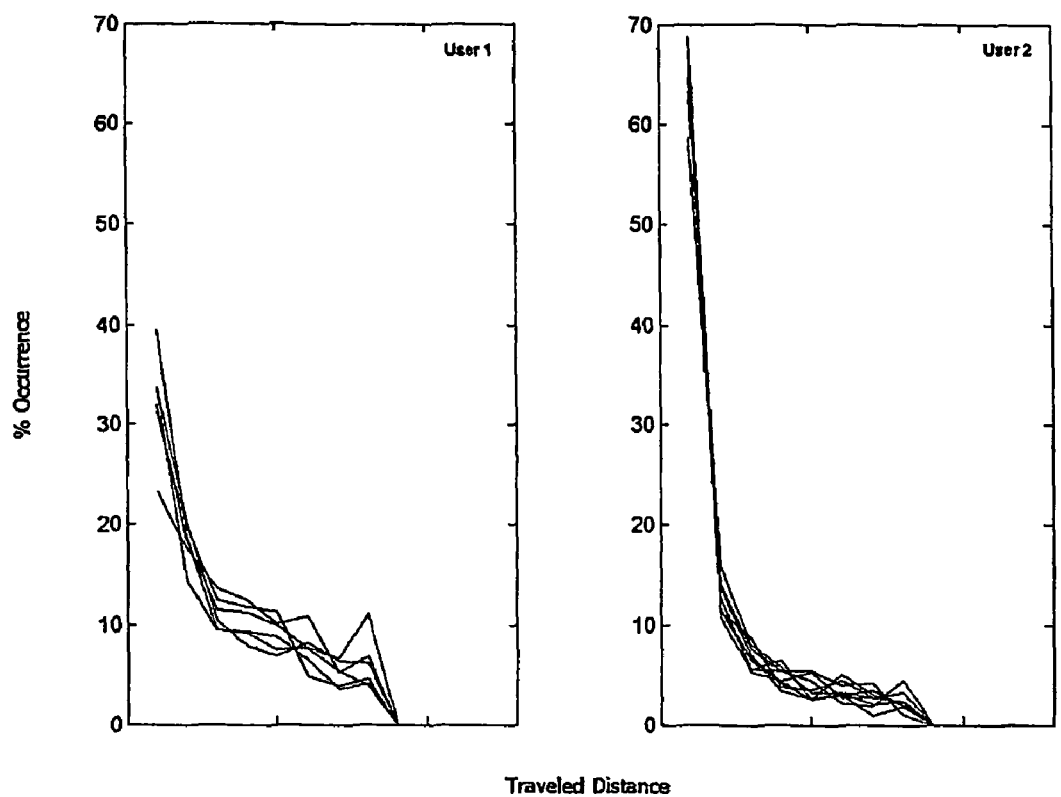

FIG. 14. Comparing traveled distance histograms.

Figure 15:
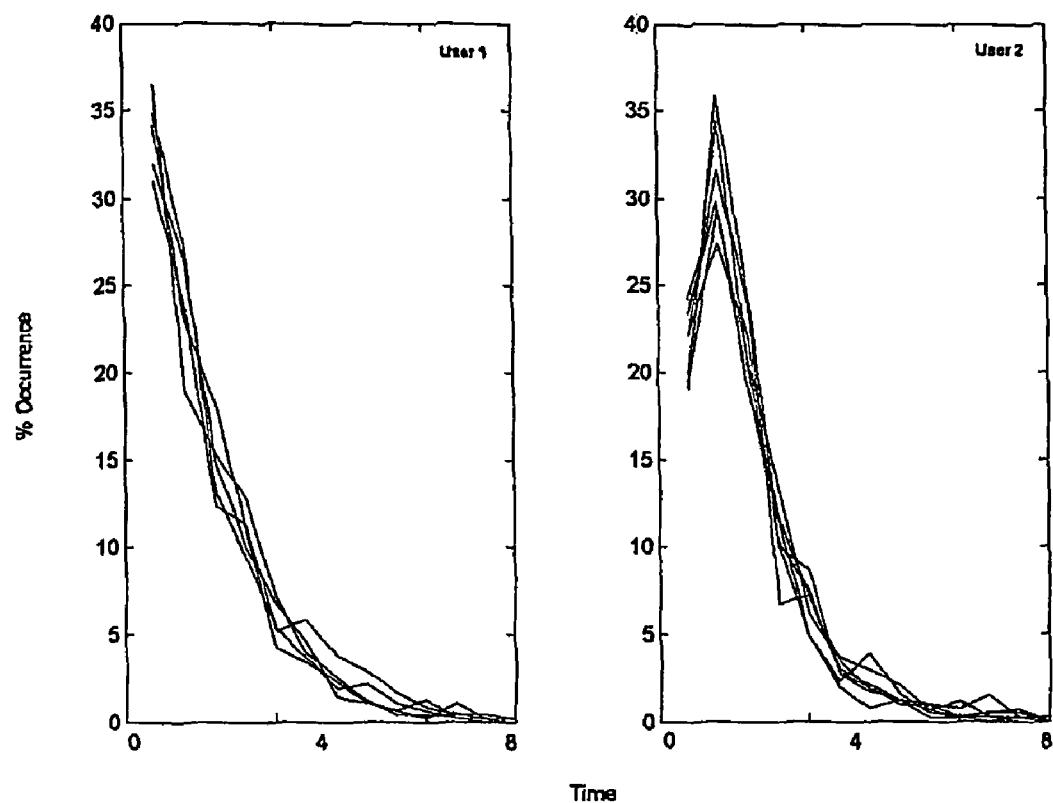

FIG. 15. Comparing elapsed time histograms.

Figure 16:
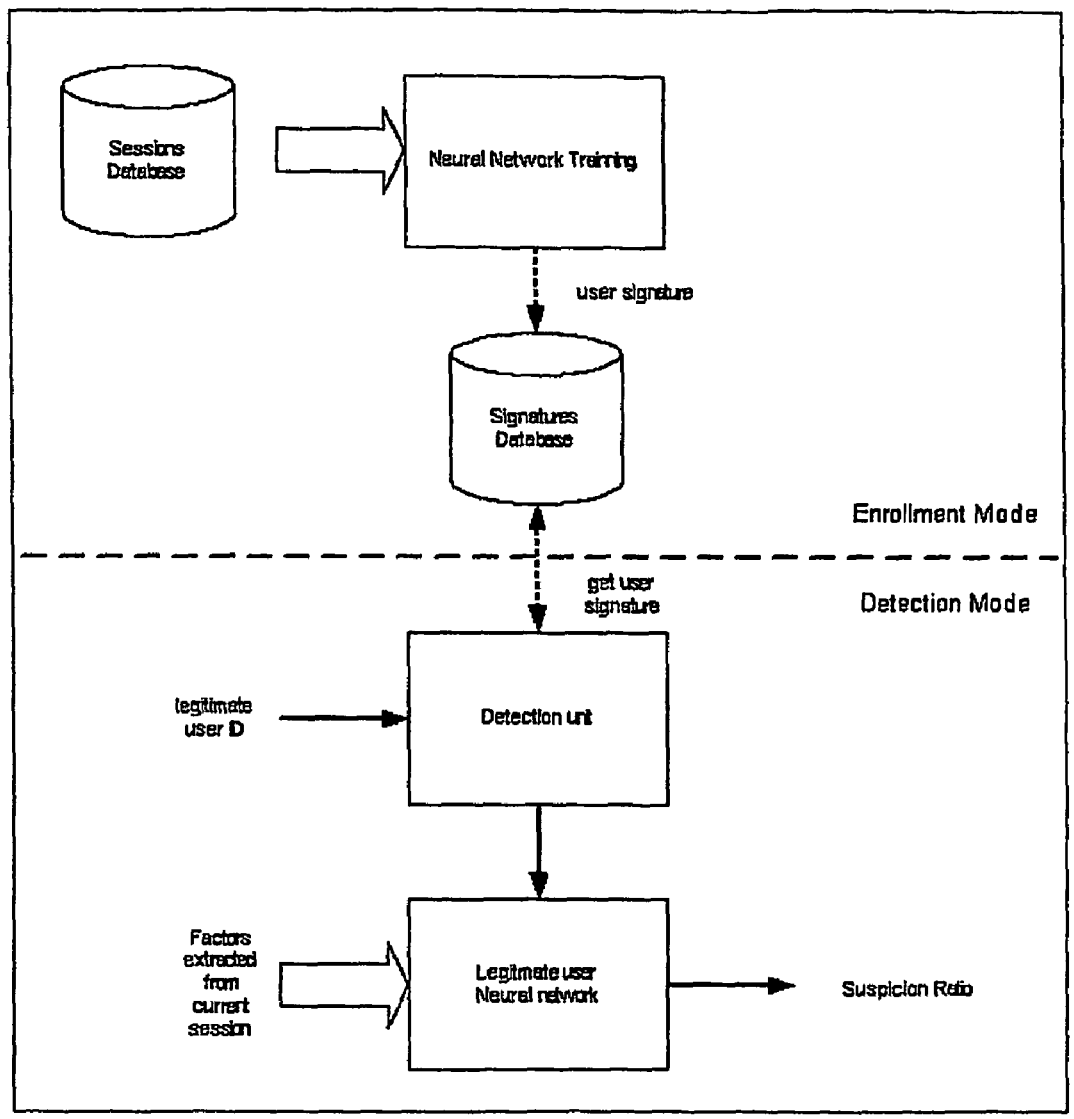

FIG. 16. Implementation of the detection neural network.

Figure 17:
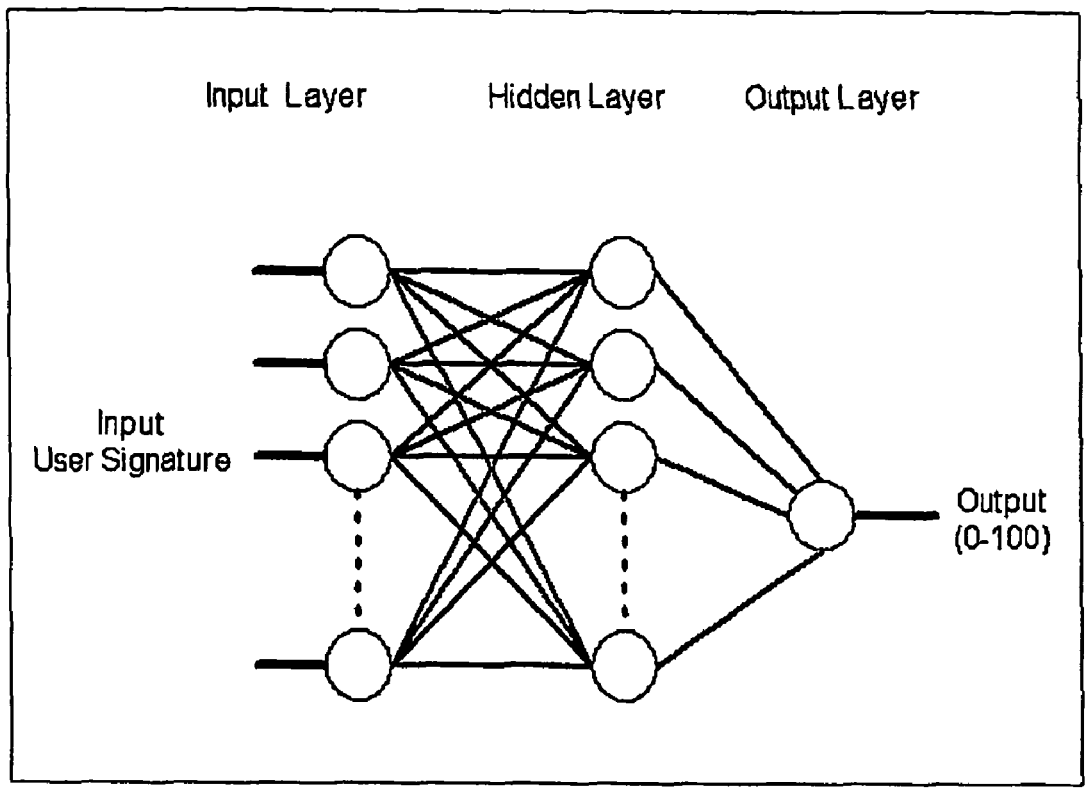

FIG. 17. Neural Network used for behavior classification.

Figure 18:
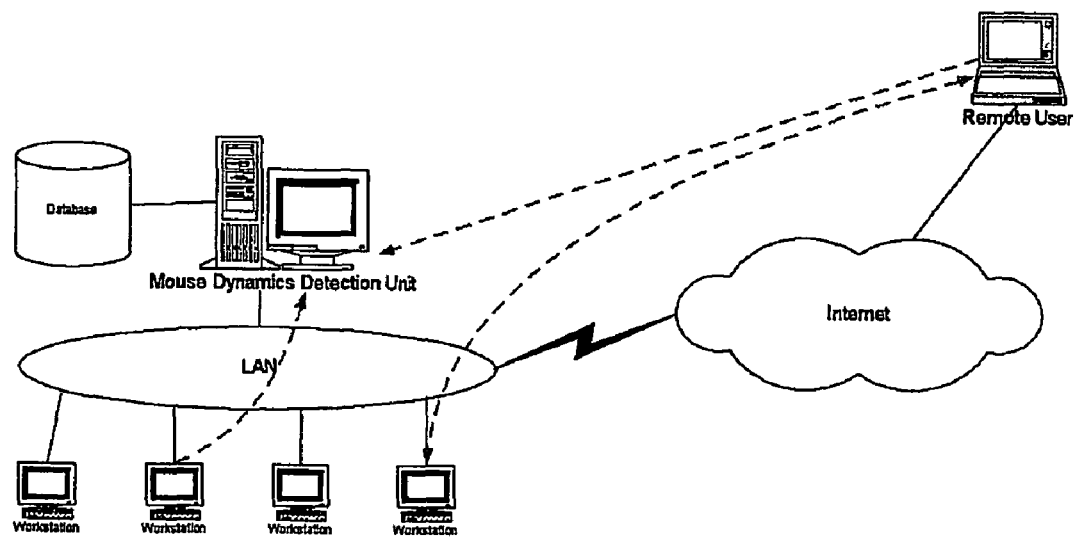

FIG. 18. Experiment hardware setup.

Figure 19:
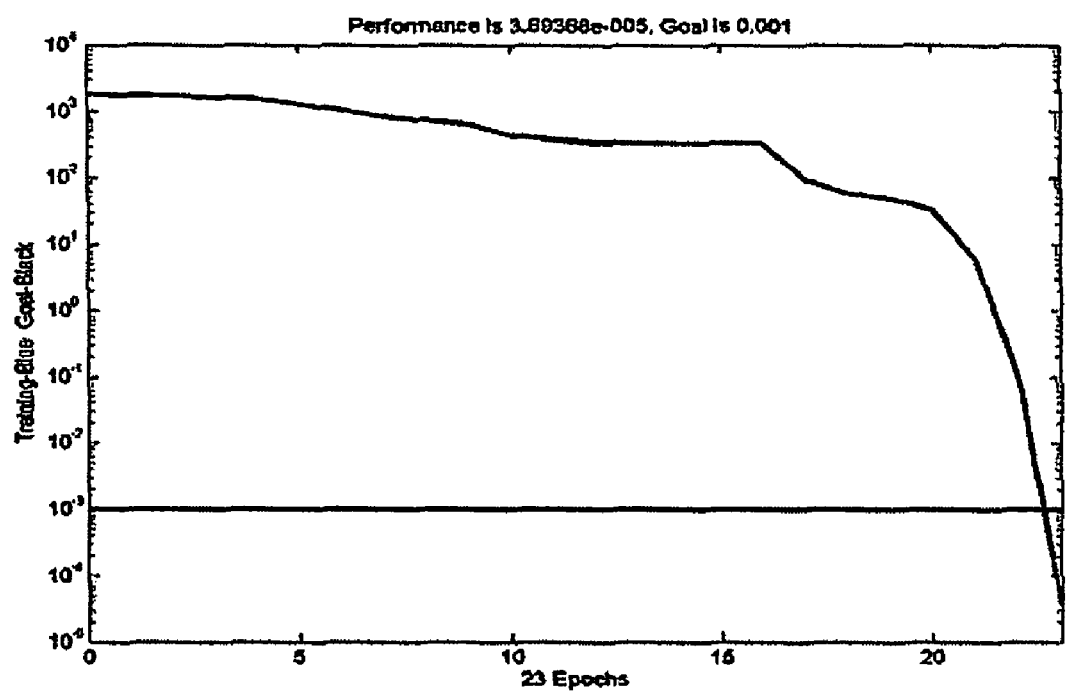

FIG. 19. Neural network training curve for the first user.

Figure 20:
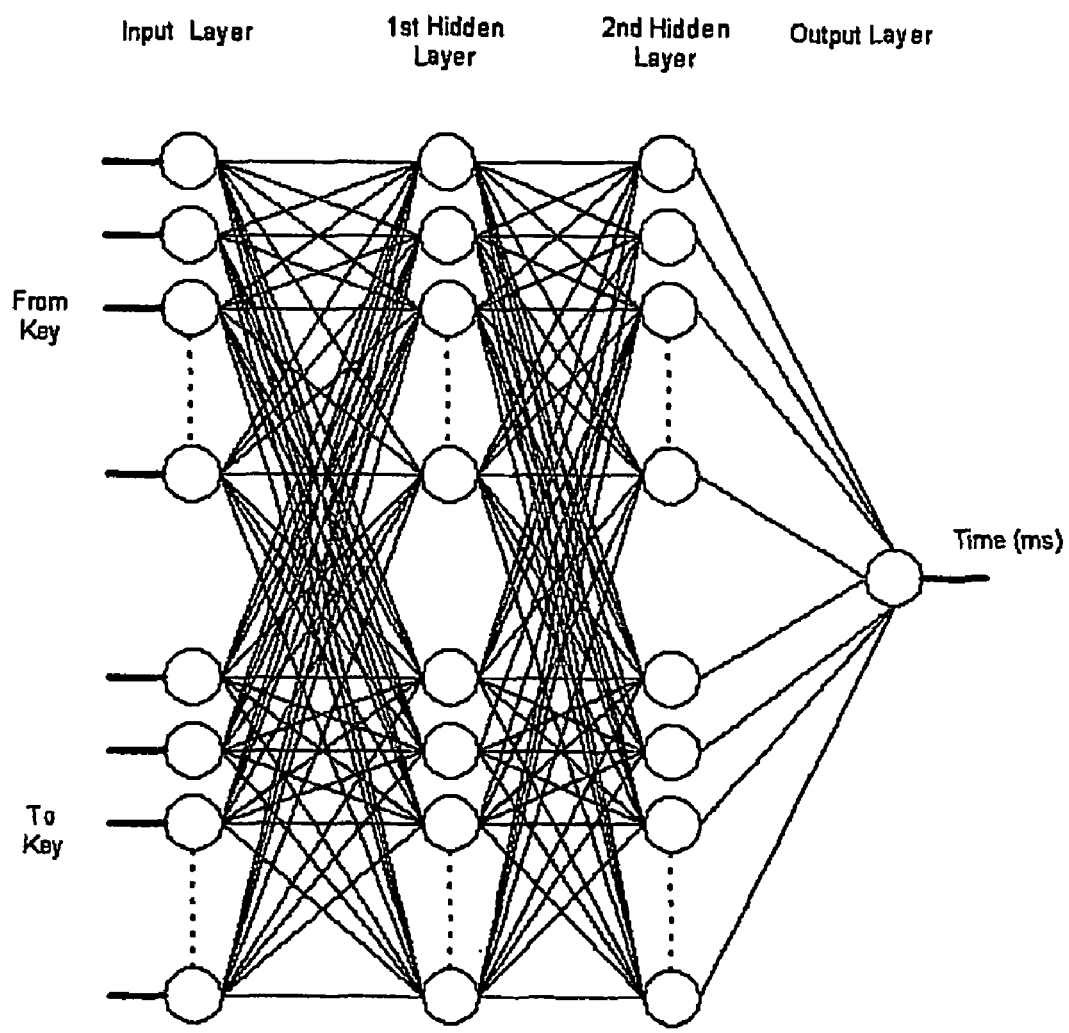

FIG. 20. Neural network model used in the detector.

Figure 21:
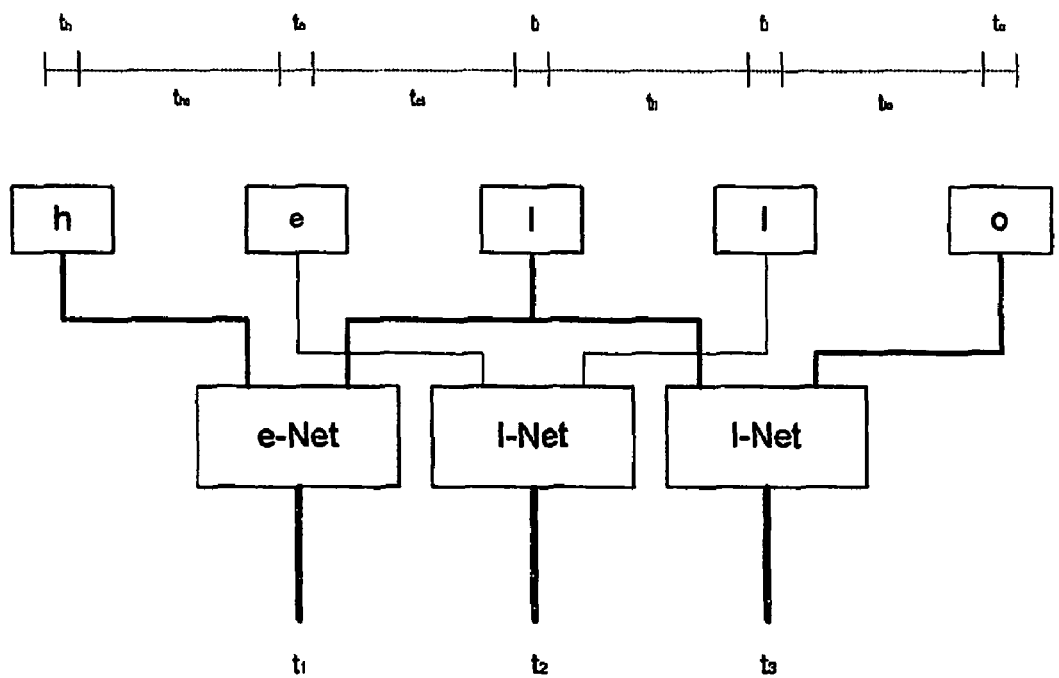

FIG. 21. Tri-graph based analysis.

Figure 22:
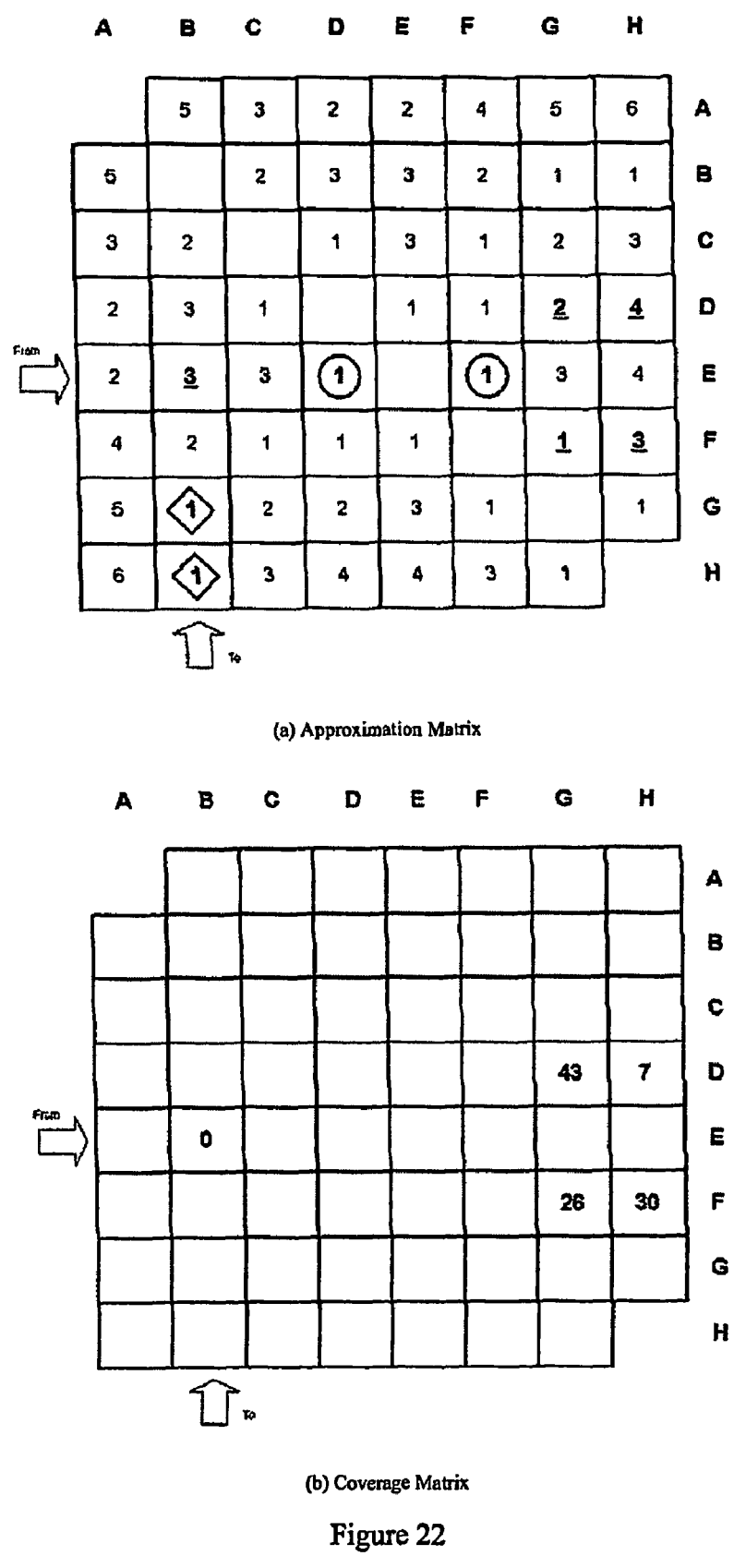

FIG. 22. Example on how to approximate unavailable digraphs.

DETAILED DESCRIPTION OF THE INVENTION

There a re two embodiments of the system of the present invention, as shown in FIG. 1. The first is keystroke dynamics and the second is mouse dynamics. These both record movement related to the use of the article under normal conditions of operation.

Keystroke Dynamics:

This biometrics measures the dwell time (the length of time a key is held down) and flight time (the time to move from one key to another) for keyboard actions. After these measurements are collected, the collected actions are translated into a number of digraphs or tri-graphs and are then analyzed in order to produce a pattern. In access control applications the extracted group of digraphs and tri-graphs are pre-defined since the user is asked to enter a paragraph containing them. In intrusion detection applications, however, this scenario is not applicable. Detecting the behavior from an unexpected set of digraphs requires large amounts of data to be collected in the enrollment mode so as to cover a higher percentage of the captured data in the verification mode. Regardless of the application, an algorithm generates a Keystroke Dynamics Signature (KDS), which is used as a reference user profile. To construct the KDS, we use a key oriented neural network based approach, where a neural network is trained for each keyboard key to best simulate its usage dynamics with reference to other keys. We also propose a technique which can be used to approximate a tri-graph value based on other detected tri-graphs and the locations of the keys with reference to each other, aiming to minimize the failure to compare ratio (FTC) and to speed up the user enrollment process.

Mouse Dynamics:

Selected mouse actions generated as a result of user interaction are compared with a graphical user interface. The data obtained from these actions are then processed in order to analyze the behavior of the user. Mouse actions include general mouse movement, drag and drop, point and click, and silence (i.e. no movement). The behavioral analysis utilizes neural networks and statistical approaches to generate a number of factors from the captured set of actions; these factors are used to construct what is called a Mouse Dynamics Signature (MDS), a unique set of values characterizing the user's behavior over the monitoring period. Some of the factors consist of calculating the average speed against the traveled distance, or calculating the average speed against the movement direction. Presently up to seven factors that exhibit strong stability and uniqueness capability are reported, however, more may be considered. The detection algorithm calculates the significance of each factor with respect to the other factors in the same signature, and with respect to its corresponding values in other users signatures. A neural network is trained for each enrolled user resulting different detection scheme to be used for each of them.

Architecture:

FIG. 2 depicts the architecture of the detector. The detector is implemented as client server software. The client module, which runs on the monitored machine (e.g. potential victim), is responsible for mouse movement and keystroke data collection. These data are sent to the server software, which runs on a separate machine. The server software is in charge of analyzing the data and computing a biometrics profile. The computed profile is then submitted to a behavior comparison unit, which checks it against the stored profiles For remote users, the approach consists of either providing them with remote login software or extending secure remote login software such as Security Shell (SSH). The administrator then requires that users use this particular remote login implementation for remote access.

It is common practice in most organizations that remote access be regulated by a defined and strict policy. In order to ensure that only users abiding by this policy access the monitored network, the biometrics detector is extended with a network traffic analyzer that monitors both attempted and established connections to the target machine. A connections list established by the traffic analyzer is compared against the active users list maintained by the core biometrics detector, and possible discrepancies are then reported as intrusions to the security administrator. This applies even when the data collection module is installed on the target machine.

If the network analyzer detects resource usage on the target machine while there is no biometrics data collected during a session, this will raise the possibility that corresponding network traffic is due to a malicious process, which is not being executed by a legitimate user. On the other hand, if the biometrics detector is able to monitor activities on the target machine while the network analyzer failed to detect the network traffic resulting from such activities, this will raise the possibility that the attacker managed to modify the behavior of the running application.

A key issue concerns the protection of the biometrics data collected from forgery. To ensure that an intruder cannot intercept and modify the collected data, secure communication protocols for client and server interactions are used. Forgery can still happen by observing the biometrics generation process or by stealing biometrics samples. In the particular case of mouse and keystroke dynamics forgery by, observation is extremely difficult to achieve. For each machine connected to the protected domain the administrator may enforce the following policy:

"
- There is NO rexec or telnet access to this machine.
- There is NO rlogin or rsh access to this machine from outside of DOMAIN_P.
- FTP is NOT secure and may be removed from this machine in the near future.
- To access this machine remotely, use Secure Shell protocol 2 (SSH2), Secure FTP (SFTP), and/or Secure Copy Protocol (SCP)
- Bio Client Version 1.0 should be running on the remote side in order to access the machine remotely.
- Software available on this machine is listed at: http://Web_Domain/computing/software.shtml
- Use of this facility must adhere to: 'Policy 6030: Organization Computing and Telecommunications User Responsibilities', -continued

```
         http://Web_Domain/policies/pol6000/6030CTUR.html AND
         'Organization Standards for Professional Behavior',
         http://Web_Domain/policy/professional-behaviour.html
    -    Note that this machine will usually be rebooted at the end of
         every month. Please schedule your jobs accordingly.
    System Administrator: admin                              Apr 04 2004"
```

Mouse action can be classified as, for example, but not limited to, one of the following categories:
1. Movement (General Movement)
2. Drag and Drop (the action starts with mouse button down, movement, then mouse button up)
3. Point & Click (mouse movement followed by a click or double click)
4. Silence (No Movement)

Different approaches are used in each category to collect the factors characterizing it. Some examples of the type of factors collected from each analysis are the following:

Calculating the average speed against the traveled distance.
Calculating the average speed against the movement direction (eight directions are considered).
Calculating the average traveled distance for a specific period of time with respect to different movement directions. From such data we can build a usage pattern for the different directions.

For each factor, the reproducibility and discrimination capability is then determined.

Data Acquisition and Processing

FIG. 3 shows a mouse dynamics detector system, generally referenced as 10. The system 10 consists of three units: a Data Interception Unit 12, a Behavior Analysis Unit 14, and a Behavior Comparison Unit 16. The detector 10 translates biometrics information into representative data, stores and compares different results, and outputs the user identity verification result.

The Data Interception Unit 12 is responsible for transparently intercepting and converting all mouse movements and actions into meaningful information. It continuously feeds the Behavior Analysis Unit 14 with the processed data. The Behavior Analysis Unit 14 is responsible for analyzing the received data, identifying working sessions, and modeling the data to produce the MDS. The functionality of the Behavior Analysis Unit 14 changes according to the operation mode. In the enrollment mode, it works on data from different sessions to produce the reference MDS for the user. In the verification/identification mode, this unit generates the MDS for the user during the detected session.

The Behavior Comparison Unit 16 is responsible for comparing the generated MDS to the reference MDS of the user. This unit maintains a database of all reference signatures calculated for all known system users. This database is used for the user identification/verification purpose. The Behavior Comparison Unit 16 uses specific comparison algorithms for different MDS factors. The output of the unit is a ratio representing the difference between the detected behavior and the reference one. The higher this ratio is, the more confident the system is that the signature is for the same user. Other security modules (e.g. intrusion detector) for different security needs can use this ratio as a biometrics suspicion ratio on the identity of the user.

The first step in the detector 10 is to monitor the mouse actions. Running a process in the background that hooks all mouse actions transparently, without affecting the application receiving the actions, accomplishes this. The data collected are a list of actions, for example, but not limited to mouse move event, left button down event, or left button up event. Such events do not provide meaningful information that can be used in analyzing the behavior. Consequently, it is the responsibility of the interception software to translate those events into meaningful actions. For example, a set of actions that is considered to be a good input to the behavior analysis unit could be represented by the following series of events, measured in milliseconds:

a mouse movement from a position to another position,
followed by a period of silence,
followed by another mouse move ended by a click or double click.

The interception software also detects the direction of movement for each generated movement action. Eight movement directions are considered in the data interception unit 12 software. The interception software will continuously feed the behavior analysis unit 14 every time mouse actions are detected on the monitored workstation 18. An example of the produced record contents is the type of action, the movement direction, the traveled distance, and the elapsed time in milliseconds. FIG. 4 shows an example of the intercepted data. The x-axis represents the traveled distance and the y-axis represents the movement speed. Each point on this figure represents an intercepted mouse action. For simplicity of the example the effects of the type of action and movement direction are ignored. Thus, this curve gives a general idea of how the user mouse movement speed is affected by the distance traveled. The data interception unit 12 deals directly with the mouse 20.

One of the parameters affecting the accuracy of this detector is the desktop resolution. If the reference MDS has been calculated on a specific resolution while the detection process has been done on a different resolution, this will affect the range of the data collected and will be reflected on the results. Another parameter is the operating system mouse pointer speed and acceleration settings. Any changes to these settings can affect the calculated figures and also affect the user behavior itself while dealing with the mouse input device. As an example, if the mouse pointer speed is slow, the user will need more than one action to move the pointer along a distance, whereas a single action at medium speed may be all that is required to move the same distance. The mouse button configuration will also affect the detector 10. In order to achieve reproducible results, variable factors should be fixed for each user on a specific workstation 18.

Session Identification

As the behavior analysis unit 14 receives input from the data interception unit 12, the data will be processed in batches. Each batch consists of a number of monitored actions. A number of parameters are used in this process:

Session start is determined if an action is received for a specific user, and there were no current sessions in effect for this user.
Session end is determined if the current active session length reached the maximum limit, or the number of recorded actions in this session exceeded the maximum limit. This limit is calculated based on several factors; it can be calculated per user, depending on the average number of actions the user produced in a period of time.

A session tag is associated with each session. This tag contains information on the session such as, but limited to, user name, machine name, Internet protocol address, start time/date, and end time/date. This module maintains a small database for the current recognized sessions. In the enrollment mode, a number of sessions for the same user will be stored in this database. These sessions will be used by the behavior modeling stage to generate the user's reference behavior. In the verification/identification mode a recognized session will be kept in the database until it is processed by the behavior modeling stage.

After the collected data has been converted into sessions, the data are filtered to decrease noise resulting from both human and machine sources. Thereafter, the behavior modeling module processes the batch of actions to generate the MDS. For example, FIG. 4 shows the traveled distance against movement speed data before the filtration process took place. Two filters were applied before sending the data to the behavior modeling stage. The first filter restricted the input data to a specific range, eliminating any data above or below that range, for example restricting the distance range from 25 pixels to 900 pixels. The second filter eliminated any reading on the y-axis that was determined to be highly deviant from the mean of its adjacent points.

Behavior Modeling

The output of the noise reduction stage was examined and compared to the output for different sessions for the same user in order to find a pattern characterizing the graph. In order to automate the detection process, however, the date were formalized. Various statistical analysis packages can be used to achieve this goal, according to the characteristic of the factor. In the present example of the traveled distance against movement speed factor (see FIG. 4), a Neural Networks was used to approximate the collected data to a curve that could be used to identify the user behavior. One of the most common uses of neural networks is function approximation. It was shown by Hecht-Nielsen that for any continuous mapping off with n inputs and m outputs, there must exist a three layer neural network with an input layer of n nodes, a hidden layer with 2n+1 nodes, and an output layer with m nodes that implements f exactly [Hecht-Nielsen 1987]. According to those results, it was postulated that neural networks can approximate any function in the real world. Hecht-Nielsen established that back propagation neural network is able to implement any function to any desired degree of accuracy [Hecht-Nielsen 1989].

A feed-forward multi-layer perceptrons (MLP) network was employed for the neural network. MLP is one of the most popular network architectures; it is widely used in various applications. The network is depicted in FIG. 5 and consists of a number of nodes organized in a layered feed-forward topology. The feed-forward topology consists of an input layer, an output layer and one hidden layer.

All connections between nodes were fed forward from inputs toward outputs. The MLP network used a linear Post Synaptic Potential (PSP) function; the PSP function used was the weighted sum function. The transfer function used in this network was the log-sigmoid function. The function generated outputs between 0 and 1 as the neuron's net input went from negative to positive infinity (see FIG. 6).

A linear transfer function was used for the input and output layers to allow the expected input and output range. For faster training, the network wss initialized with the weights and biases of a similar network trained for a straight line.

The output of the neural network was described by the following equation:

$$y = \left( \sum_{j=1}^{N} w_{2j} \cdot \frac{1}{1 + e^{(\sum_{i=1}^{N} w_{ij} \cdot x) - b_{ij}}} \right) - b_2$$

Where $w_{ij}$ and $b_{ij}$ represent the weights and biases of the hidden and output layers respectively, x is the input to the network, and N represents the number of nodes in the hidden layer (which is set to N=5 in our design).

The back propagation algorithm was used to train the network. The back propagation algorithm searched for the minimum of the error function in weight space using the method of the gradient descent. The error criterion of the network was defined as follows:

$$E = \frac{1}{2} \sum_{i=1}^{P} (t_i - y_i(x_i, w))^2$$

Where w represents the network weights matrix and p is the number of input/output training pairs set. Weights were adjusted during the training trials until the combination of weights minimizing the error criterion were found. This set of weights was considered a solution for the learning process. The back propagation learning rule, which calculates the weight increment, was described as follows: $\Delta w_{ij} = \eta \cdot \delta_j \cdot y_i$ where $\eta$ is a trial independent learning rate, and $\delta_j$ is the error gradient at node j.

During the behavior modeling stage, the neural network was trained with filtered collected data. Input vectors and their corresponding target vectors were used. The back propagation-raining algorithm was used to train a network until it could approximate a function describing the collected data.

The training approach may involve the curve over-fitting problem. In order to avoid the over-fitting problem, first the right complexity of the network was selected. A network with a single hidden layer containing five perceptrons was sufficient to produce a good result. Training of the network must be validated against an independent training set. At the beginning of the training, the training error and the validation error decreased until it reached a point where the validation error started to increase. This point is the stop point (corresponds to point A in FIG. 7). The stop point is where the training should stop to obtain the desired generalization.

After the network-training curve reached the stop point, the network was fed with a test stream presenting the spectrum of the input data. The result was a curve approximation of the training data. This curve was considered as a factor in the MDS for this user.

FIG. 8 shows examples of mouse signatures calculated for the same user over a number of sessions. Notice that the curves are very close and that the deviation from their average is low. An approach for calculating the reference mouse signature was to use the average from a number of sessions as a reference. Large deviations between different sessions would show that the training is not completed properly. This provides an indication that there is need for tuning.

Determination of the proper detection session period is an important factor to consider. The aim is to minimize the detection session without affecting the accuracy of the system.

After the generation of the mouse signature, which represents the user behavior, an important concern is how to discriminate between users based on the generated information. The function of the Behavior Comparison Unit 16 is to compare the calculated factors (Mouse Signature) against a reference signature for the same user.

FIG. 9 gives an example of the comparison process. The two curves in FIG. 9a were for the same user. Notice that the two curves are close to each other and that the difference between the curves is low. FIG. 9b shows two curves for two different users. The difference between the curves is high, which indicates a high difference in the behaviors and a high possibility that they belong to two different users.

The comparison technique used for this factor was to calculate the sum of the absolute difference between the curves. If the result is higher than a threshold, then those curves belong to two different users. The threshold can be determined for each user during the enrollment phase, when the reference mouse signature is generated.

Movement Speed compared to Traveled Distance (denoted MSD) factor had strong discriminating and reproducibility capability. Consequently, the MDS could be based on this factor, however basing the MDS on the combination of several of these factors tends to yield better performance.

The analysis of the impact of the direction of movement (MDH) involved two kinds of studies. First, studying the relation between the direction of movement and the movement speed (denoted as MDA). Second, studying the population of actions with respect to the movement direction, measured by calculating the percentage of actions in each of the recognized eight directions of movements compared to the total number of actions in a session.

FIG. 10 shows the distribution of average movement speed against the direction of movement for two different users. Solid lines represent a number of sessions for the first user. Dotted lines represent the second user's sessions. Notice that horizontal movements (directions 2,3, 6, and 7) were performed with higher speed than vertical movements (directions 1,8,4, and 5).

FIG. 11 shows the histograms of the performed actions in each direction. Notice that some directions gained more actions than others. Furthermore, there was usually a direction that consumed more actions than all other directions. The figure shows the distribution for two different users: user 2 performed more actions in the $3^{rd}$ direction, while user 1's actions dominated more in the $4^{th}$ direction. The ratios between curve points were approximately constant for each user, indicating high reproducibility for this factor.

MDA and MDH factors were each represented by eight numbers to be added to the user's signature. The amplitude of those numbers, and the ratio between them produced meaningful information toward behavioral user identification.

Type of action analysis is based on the fact that the type of action the user is performing affects his behavior. Three types of movements were considered: point and click (PC), drag and drop (DD), and regular mouse movement (MM). Similar to the direction of movement study, the type of action was studied with respect to the movement speed (denoted ATA) and the distribution of the performed actions over the three types of actions (denoted ATH). FIG. 12 shows the relation between the movement speed and the type of performed action for the three recognized types of actions. Two components were extracted from the curve: the range of each type of action, and the ratio between the entries. It is possible to rely on this factor for identification if the ratio between the entries is constant. For example, the speed of movement for user 2 in FIG. 12, was at its lowest level for the point and click type of action compared to other types of actions.

FIG. 13 shows the histogram of the types of actions for a number of sessions for two different users. Behavior differences were easily detected for the two users and values and ratios between entries were easily identified. The following facts were extracted from the curves:

User 1 performed a very low number of regular mouse movements and depended mostly on point click and drag drop types.

User 2 performed a very high number of regular mouse movements, and a very low number of point and click actions.

The reproducibility of this factor was high. Additionally, it was relatively unique to the user. The information extracted from the analysis was very helpful for the detection module to differentiate between the behavior of users.

The histogram of the traveled distance (denoted TDH) illustrates how the user performed actions. The number of actions performed with short distances was higher than those performed with long distances.

The distribution of the distances differed from one user to another. FIG. 14 shows a comparison between two users: user 2 depended more on short distances for performing actions. As the probability of occurrence of large distances is usually low (below 15%), it is possible to depend only on the first two points of the curve to represent this characteristic. The reproducibility of this factor was found to be high, while its uniqueness was considered average.

The elapsed time is the time used to perform an action. It depends on the type of the performed action. The study of movement elapsed time histograms (denoted MTH) illustrates how a user's speed varies when he is performing some actions. FIG. 15 shows the time distribution for two users; the measurement unit used was 0.25 second. The curve shows the distribution for actions performed in 8 seconds and less, with a 0.5 second interval between curve points. From this figure we concluded that the reproducibility of this factor was good. In fact, the first two points of the curve provided significant behavioral information.

For example:

For user 1, the first point in the curve (0-0.5 second) represented around 34% of the total number of actions.

The maximum population for user 1 happened in the first point on the curve, while the maximum for the second user happened in the second point (0.5-1.0 second).

The results indicated that the first 3 points of the curve could be used to represent this factor in the user global signature (e.g. MDS).

By studying the data collected from the experiment and analyzing their statistical characteristics, the following observations were made:

1. The reproducibility of each factor of the mouse signature varied, depending on the user and the type of factor. Factors with higher reproducibility gained more weight in the detection process.
2. It was noticed that for some users, some factors had a stronger discrimination capability than for other users. The uniqueness factors with higher reproducibility gained more weight in the detection process.

In order to utilize the observations, the detection technique assigned the proper level of significance to each factor according to its reproducibility and its uniqueness. The reproducibility of a factor were detected by analyzing more sessions for the user, while the uniqueness characteristics was detected by including a larger number of other users' sessions in the comparison process. In other words, the detection algorithm was able to build an identification pattern for each user and utilize all detectable unique characteristics to discriminate efficiently between different behaviors.

The detection approach adopted in this document consisted of using neural networks to detect differences between behaviors. Similar neural networks approaches have been used successfully in different recognition applications, such as face recognition and signature recognition.

The approach consisted of conducting a different neural network training on a per user profile basis. FIG. 16 illustrates how the detection process is implemented in both the enrollment and detection modes of operation. In order to enroll a new user, training data was prepared from previously recorded sessions stored in the behavior modeling unit database (see FIG. 3). Second, a neural network was trained and the status of the trained network was stored in the signatures database associated with the behavior detection unit.

In the detection mode, the behavior detection unit loaded the legitimate user's stored neural network status. The saved status was then applied to the network, and the monitored behavior resulting from session analysis was applied to the neural network. The output of the network was the confidence ratio, a percentage number representing the degree of similarity of the two behaviors.

The neural network used in the detection process (see FIG. 17) was a feed-forward MLP network consisting of three layers. The input layer consisted of 39 nodes, which is the total number of inputs representing the factors involved in the MDS. The hidden and output layers consisted respectively of 40 and one nodes. The expected output range was from 0 to 100. Table 2 shows the description of the inputs to the network, which consisted of a set of numbers describing the MDS.

TABLE 2

Examples of Factors involved in a Mouse Signature

| Factor | Description | Inputs |
|--------|-------------|--------|
| MSD | Movement Speed compared to Traveled Distance | 12 |
| MDA | Average Movement Speed per Direction of Movement | 8 |
| MDH | Direction of Movement histogram | 8 |
| ATA | Average Movement Speed for Action Types | 3 |
| ATH | Type of Action Histogram | 3 |
| TDH | Traveled Distance Histogram | 2 |
| MTH | Movement Elapsed Time Histogram | 3 |

The transfer function of the neural network was a Log-Sigmoid function. The output of the network can be defined as follows:

$$y = \left(\sum_{j=1}^{N} w_{2j} \cdot \frac{1}{1 + e^{(\sum_{i=1}^{N-1} w_{ij}x_i) - b_{1j}}}\right) - b_2$$

Where $x_i$s represent the inputs to the network, and $w_{ij}$, $b_{ij}$, and N as defined previously. N-1 represents the number of nodes in the input layer. The back propagation algorithm was used to train the network. The data prepared for network training was designed as follows:

1. Positive training: data collected from 5 sessions for the user trained for an output of 100, meaning 100% confidence in identity.
2. Negative training: data collected from other users based on 5 sessions per user with an output of 0, meaning 0% confidence in identity.

FIG. 19 shows the training curve for one of the users; the error level is set to be 0.001. The results indicate that the network was able to detect a pattern specified only for the user to differentiate his behavior from others.

Example 1

Experiments involving 22 participants were conducted over 9 weeks. Participants installed the client software and used their machine for their routine activities. Mouse and keystroke data were collected transparently and sent to a central server. At the end of the data collection phase, we used the collected data to conduct an offline evaluation of our detection system. To do so, we divided the participants into 2 groups: a group of 10 representing authorized users and a group of 12 representing unauthorized users. We computed a reference signature for each member of the first group using some of their own sessions. For each legal user we used the sessions belonging to the other users (authorized and unauthorized) to conduct some masquerade attacks on their reference signature. This resulted in a false acceptance rate of 0.651%.

To evaluate the false positives, for each legal user we compared their own remaining sessions (not involved in the computation of the reference signature) against their reference signature. This resulted in a false rejection rate of 1.312%.

FIG. 18 shows the hardware setup of the experiment. Client software (responsible for monitoring mouse actions) feeds a detection server (software) with the monitored data. The client software, which runs as a background job, starts monitoring user actions when the user login occurs, and stops running when the user logout occurs; the software is totally transparent and does not affect any other application.

The detection server was installed on a local area network and accepted connections from local workstations and from outside the network over the Internet to allow remote users to participate in the experiment. A large number of participants were connected remotely to the network from their home computers or from different countries or cities. The server software stored the collected data in an internal database, along with the session information containing the user ID and other information.

The hardware configurations of the participating computers varied from P2 266 MHz to P4 1.5 MHz. The server configuration was a P3 450 MHz with 256 MB Ram, running the Windows 2000 operating system. The client workstations ran different versions of Microsoft Windows operating system (Windows 98SE, Windows ME, Windows 2000, and Windows XP).

Data were collected over a number of 998 sessions on an average of about 45 sessions per user. We started the experiment with a maximum detection period of 20 minutes for the $1^{st}$ week, followed by 15 minutes sessions for the rest of the experiment duration. The entire experiment lasted 9 weeks. The number of recorded actions in a session directly affects the training of the neural network. We set the maximum number of actions in a session to 2000. If the number of actions exceeded this limit, another session was created and the newly recorded action would be registered in the new session.

After examining the recorded session data for different users, we noticed that some of the users produce much more actions in their active sessions than others. Identifying such users is much easier than those who generate a lower number of actions.

For the enrollment process, the first five sessions were used to develop the reference signature. We then found that data collected from five sessions was enough to develop the reference MDS for most of the users. To do this, we average the resulting signatures for the five sessions to construct the reference signature, which is then used in the identification/verification mode.

To simulate real life in our experiment, we randomly divided the participating users into two groups: insiders group (10 users/405 sessions) and outsiders group (12 users/593 sessions). A reference signature was calculated for each user in the first group and stored in the database. Sessions of the outsiders' group were used to simulate an attack where the attacker signature was not recorded in the database, thereby testing the ability of the detection algorithm to target such situations. We conducted the analysis of the experiment results in two steps, each addressing one of the two hypotheses that have been formulated at the beginning of this section.

The first part of the analysis was to prove that there was a detectable difference between a user's signature and all other users' signatures in both the in siders' and outsiders' groups. We confirmed this by applying the behavior comparison algorithm to sessions collected from different users against a reference signature of a given user. FAR was calculated by conducting this test for all available reference signatures of all the users in the insiders' group. False acceptance was established if the resulted confidence ratio was over 50%. Fifty sessions out of the 405 sessions of the insider group were dedicated for computing reference signatures for the 10 members (5 sessions per user). For each member in the insider group the remaining insiders' sessions minus his own sessions were used to conduct insider attacks against him, which corresponds to a total of 3195 (=355×10−355) insider attacks. For each user in the insider group, the totality of sessions in the outsider group was used to simulate outsider attacks, which corresponds to a total of 5930 (=593×10) outsider attacks. Hence, 9125 (=5930+3195) masquerade attacks against the insider group were simulated. Masqueraders are (malicious) users impersonating different (legitimate) users [Anderson 1980].

To illustrate the detection process, Table 3 shows a sample training data for five different users. The sample data consists of four factors covering five sessions per user. The output shown was set to train the network for the first user. FIG. 19 shows the training curve for the first user, indicating its ability to differentiate between this user and others. To simulate the FAR calculation process, Table 3 shows the confidence ratio for all the included sessions after the network has been trained for the first user. Table 4 shows signatures for one insider (User 5) and two outsiders masquerading as User 1. The insiders signatures shown are different from those used in the network training; the corresponding confidence ratio is also shown in the figure. After running all the comparisons, we computed the false acceptance rate as follows:

$$FAR = \frac{n_{fa}}{N_{fa}}$$

where $n_{fa}$ was the number of false acceptance and $N_{fa}$ the total number of tests. At 50% threshold, we obtained in our experiment FAR=0.00651, for $N_{fa}$=9125 attacks attempts.

An analysis of legal connections was conducted only on the insiders' group, in which all reference signatures were already calculated for all the group members. The sessions of each member of the insider group, which were not involved in the calculation of the reference signature, were applied to the detection algorithm. A total of 355 (=405-50) legal connections were simulated for the whole group. A false rejection was established if the confidence ratio was below 50%. Table 5 gives an idea of the FRR calculation process. The figure shows a sample signature for 15 sessions for the same user (user 1), and the confidence ratios computed using his trained neural network.

TABLE 3

Training data for five different users

| | MDH | | | | | | | | ATH | | |
|---|---|---|---|---|---|---|---|---|---|---|---|
| User 1 | 8.51 | 16.24 | 11.93 | 6.84 | 11.742 | 21.72 | 11.35 | 11.35 | 48.33 | 27.78 | 23.67 |
| | 8.93 | 15.23 | 11.20 | 11.03 | 14.01 | 21.71 | 6.30 | 11.38 | 51.13 | 34.32 | 14.36 |
| | 11.82 | 13.34 | 9.98 | 4.89 | 14.69 | 20.43 | 9.96 | 14.69 | 51.52 | 42.23 | 6.081 |
| | 9.02 | 12.5 | 9.37 | 10.76 | 11.80 | 21.52 | 8.50 | 16.31 | 52.95 | 35.41 | 11.45 |
| | 8.98 | 14.23 | 9.68 | 8.61 | 19.33 | 21.61 | 7.029 | 10.36 | 50.08 | 35.32 | 14.41 |
| User 2 | 7.74 | 11.26 | 13.61 | 6.10 | 12.91 | 16.19 | 12.67 | 19.24 | 38.02 | 0.93 | 60.79 |
| | 14.28 | 11.22 | 6.68 | 10.45 | 12.75 | 16.83 | 13.01 | 14.28 | 34.69 | 1.02 | 64.03 |
| | 16.1 | 12.74 | 9.37 | 9.61 | 12.74 | 14.42 | 14.90 | 9.85 | 31.01 | 3.84 | 64.90 |
| | 15.36 | 10.48 | 10 | 8.53 | 13.41 | 14.39 | 15.38 | 12.19 | 34.63 | 5.85 | 59.26 |
| | 17.81 | 12.82 | 12.11 | 9.97 | 8.31 | 19.47 | 9.50 | 9.73 | 45.84 | 6.17 | 47.74 |
| User 3 | 10.30 | 14.52 | 7.02 | 9.60 | 13.81 | 21.31 | 13.11 | 10.07 | 47.77 | 19.43 | 32.55 |
| | 14.03 | 11.35 | 8.90 | 13.58 | 14.69 | 14.69 | 11.13 | 11.35 | 42.53 | 20.93 | 38.30 |
| | 11.34 | 12.03 | 8.33 | 14.12 | 14.81 | 19.44 | 8.79 | 10.88 | 39.35 | 18.05 | 42.36 |
| | 10.76 | 9.23 | 12.30 | 10.51 | 15.64 | 12.82 | 14.3 | 14.10 | 42.05 | 19.74 | 37.94 |
| | 12.11 | 9.79 | 10.05 | 13.14 | 14.94 | 15.20 | 9.27 | 15.20 | 39.69 | 14.43 | 45.61 |
| User 4 | 15.68 | 5.30 | 8.19 | 22.16 | 20 | 13.97 | 3.85 | 10.6 | 24.09 | 13.97 | 61.68 |
| | 14.67 | 10.09 | 9.63 | 10.09 | 23.85 | 15.82 | 7.56 | 8.02 | 28.60 | 10.32 | 62.84 |
| | 15.42 | 4.47 | 10.69 | 16.91 | 23.38 | 12.18 | 5.72 | 10.94 | 22.68 | 12.68 | 64.17 |
| | 17.09 | 9.60 | 8.19 | 13.81 | 21.07 | 10.77 | 7.02 | 12.17 | 21.54 | 14.28 | 63.93 |
| | 12.34 | 10.61 | 12.09 | 15.30 | 21.48 | 12.09 | 8.88 | 6.913 | 29.83 | 11.60 | 58.51 |
| User 5 | 11.84 | 7.63 | 10.52 | 11.84 | 13.94 | 15 | 11.57 | 17.36 | 44.47 | 16.05 | 39.21 |
| | 15.01 | 6.77 | 9.44 | 11.13 | 18.64 | 12.10 | 11.13 | 15.49 | 33.41 | 13.55 | 52.78 |
| | 10.61 | 10.34 | 11.40 | 10.87 | 15.65 | 20.15 | 10.08 | 10.61 | 38.72 | 17.77 | 43.23 |
| | 11.80 | 12.04 | 8.19 | 8.91 | 18.79 | 17.59 | 10.12 | 12.29 | 38.62 | 13.25 | 49.88 |
| | 11.16 | 8.25 | 8.73 | 12.13 | 22.08 | 16.99 | 7.52 | 12.86 | 28.15 | 10.19 | 61.40 |

| | ATA | | MSD | | | | | | NN Output | CR After |
|---|---|---|---|---|---|---|---|---|---|---|
| User 1 | 171.2 | 33.26 | 111.54 | 16.63 | 16.16 | 15.01 | 12.18 | 6.39 | 100 | 99.996 |
| | 90.90 | 21.89 | 54.53 | 25.43 | 19.01 | 15.84 | 12.42 | 8.22 | 100 | 100 |
| | 122.28 | 24.99 | 73.11 | 29.93 | 15.18 | 14.60 | 11.94 | 5.51 | 100 | 100 |
| | 103.51 | 23.41 | 77.87 | 29.19 | 18 | 15.21 | 11.57 | 5.97 | 100 | 100 |
| | 146.19 | 38.96 | 93.46 | 21.22 | 17.77 | 14.72 | 10.83 | 5.93 | 100 | 100 |

TABLE 3-continued

Training data for five different users

| | | | | | | | | | | |
|---|---|---|---|---|---|---|---|---|---|---|
| User 2 | 198.32 | 234 | 209.37 | 19.75 | 18.19 | 15.31 | 9.50 | 8.06 | 0 | 0.0207 |
| | 170.26 | 252 | 184.41 | 20.44 | 19.02 | 15.91 | 11.94 | 8.12 | 0 | 0.0208 |
| | 261.12 | 244.7 | 181.57 | 18.17 | 15.72 | 13.46 | 11.26 | 9.01 | 0 | 0 |
| | 239.63 | 86.33 | 202.95 | 18.34 | 14.60 | 13.20 | 10.16 | 7.13 | 0 | 0 |
| | 225.78 | 64.76 | 235.32 | 15.70 | 13.53 | 11.57 | 9.56 | 7.19 | 0 | 0 |
| User 3 | 177.51 | 134.2 | 92.11 | 18.04 | 17.41 | 15.94 | 13.10 | 10.34 | 0 | 0.0207 |
| | 192.75 | 72.04 | 111.8 | 16.77 | 18.24 | 15.38 | 11.95 | 12.15 | 0 | 0.0207 |
| | 180.24 | 102.72 | 100.07 | 20.57 | 18.79 | 16.42 | 13.31 | 11.87 | 0 | 0.0207 |
| | 207.22 | 83.16 | 137.89 | 17.72 | 17.06 | 15.55 | 12.56 | 7.05 | 0 | 0.0208 |
| | 194.16 | 57.07 | 113.47 | 20.80 | 18.25 | 15.91 | 13.78 | 9.22 | 0 | 0 |
| User 4 | 176.04 | 57.3 | 82.56 | 18.25 | 17.64 | 17.08 | 16.56 | 16.05 | 0 | 0 |
| | 160.24 | 138.31 | 80.55 | 22.65 | 19.81 | 18.11 | 15.00 | 14.16 | 0 | 0 |
| | 152.7 | 103.22 | 90.82 | 19.55 | 19.55 | 19.55 | 14.15 | 12.20 | 0 | 0.0210 |
| | 130.78 | 64.39 | 101.54 | 20.17 | 20.14 | 20.1 | 17.48 | 12.16 | 0 | 0 |
| | 178.7 | 35.31 | 90.12 | 25.76 | 18.46 | 16.33 | 15.26 | 10.65 | 0 | 0 |
| User 5 | 245.73 | 148.45 | 187.92 | 17.91 | 16.78 | 13.42 | 12.70 | 8.71 | 0 | 0 |
| | 253.65 | 158.71 | 132.95 | 17.55 | 15.60 | 13.17 | 11.53 | 10.83 | 0 | 0.0193 |
| | 267.37 | 148.9 | 165.94 | 16.72 | 15.73 | 13.27 | 11.82 | 8.82 | 0 | 0 |
| | 156.89 | 161.6 | 85.64 | 18.66 | 18.26 | 15.41 | 12.16 | 8.21 | 0 | 0 |
| | 229.66 | 192.76 | 134.6 | 18.55 | 16.71 | 14.14 | 12.74 | 8.08 | 0 | 0 |

TABLE 4

Simulated Attack: One Insider and Two Outsiders Masquerading as User1

| | MDH | | | | | | | | ATH | | |
|---|---|---|---|---|---|---|---|---|---|---|---|
| Insider | 12.17 | 8.59 | 9.30 | 15.03 | 15.75 | 13.60 | 11.69 | 13.60 | 30.07 | 13.12 | 56.56 |
| User 5 | 12.02 | 10.48 | 9.71 | 10.48 | 13.81 | 24.55 | 7.92 | 10.74 | 36.31 | 14.83 | 48.59 |
| | 13.84 | 9.74 | 6.66 | 9.74 | 20 | 14.87 | 10.51 | 14.35 | 32.30 | 14.61 | 52.62 |
| | 10.62 | 8.99 | 8.17 | 10.08 | 24.25 | 12.26 | 10.08 | 15.25 | 47.41 | 19.07 | 33.24 |
| | 7.12 | 9.58 | 10.68 | 10.95 | 20.27 | 13.42 | 11.23 | 16.43 | 41.09 | 19.17 | 39.45 |
| Outsider 2 | 13.45 | 7.64 | 17.73 | 13.45 | 10.39 | 16.51 | 10.70 | 9.78 | 7.33 | 2.44 | 89.90 |
| | 9.02 | 10.6 | 17.76 | 9.28 | 8.74 | 14.75 | 16.68 | 12.84 | 13.66 | 3.55 | 82.51 |
| | 12.53 | 9.11 | 7.12 | 21.08 | 13.67 | 10.25 | 12.25 | 13.67 | 16.51 | 9.11 | 72.08 |
| | 13.05 | 5.55 | 12.22 | 15 | 13.05 | 13.88 | 13.61 | 13.3 | 13.61 | 6.66 | 79.44 |
| | 9.39 | 8.18 | 10.90 | 16.06 | 11.51 | 14.54 | 15.15 | 13.93 | 22.72 | 11.81 | 65.15 |
| Outsider 1 | 15.71 | 13.68 | 5.69 | 7.28 | 15.26 | 15.28 | 10.251 | 16.62 | 43.96 | 12.07 | 43.73 |
| | 20.58 | 13.42 | 7.60 | 9.17 | 16.55 | 9.61 | 7.83 | 14.98 | 39.15 | 9.172 | 51.45 |
| | 14.70 | 14.95 | 7.35 | 9.31 | 12.74 | 17.64 | 8.33 | 14.70 | 32.84 | 8.33 | 58.57 |
| | 18.22 | 14.80 | 8.65 | 7.51 | 10.02 | 15.94 | 13.66 | 10.93 | 41.23 | 14.80 | 43.73 |
| | 15.72 | 14.78 | 9.15 | 11.73 | 5.86 | 17.37 | 11.26 | 13.85 | 44.13 | 11.50 | 44.13 |

| | ATA | | | | | | MSD | | CR |
|---|---|---|---|---|---|---|---|---|---|
| Insider | 222.06 | 169.6 | 117.15 | 18.14 | 15.99 | 14.16 | 12.71 | 10.07 | 8.72E−07 |
| User 5 | 235.18 | 177.03 | 119.68 | 18.18 | 15.17 | 14.06 | 13.78 | 10 | 6.54E−09 |
| | 237.3 | 156.07 | 107.51 | 18.46 | 17.77 | 14.49 | 13.05 | 10.30 | 8.13E−10 |
| | 216.92 | 115.37 | 138.49 | 17.70 | 14.64 | 14.62 | 10.83 | 8.45 | 1.06E−06 |
| | 225.57 | 66.11 | 154.72 | 16.43 | 13.72 | 16.02 | 12.40 | 9.95 | 4.11E−07 |
| Outsider 2 | 272.83 | 127 | 110.82 | 19.10 | 18.95 | 17.01 | 14.56 | 11.30 | 1.43E−05 |
| | 150.32 | 69.846 | 107.05 | 22.88 | 20.35 | 17.68 | 15.49 | 12.83 | 1.39E−05 |
| | 203.2 | 58.125 | 83.02 | 21.60 | 20.26 | 18.24 | 15.21 | 10.72 | 1.43E−05 |
| | 202.69 | 105.83 | 92.629 | 20.74 | 17.83 | 16.09 | 15.01 | 10.62 | 1.43E−05 |
| | 174.61 | 87.282 | 105.58 | 22.69 | 22.69 | 16.75 | 16.75 | 12.5 | 1.39E−05 |
| Outsider 1 | 208.46 | 123.09 | 120.27 | 19.27 | 18.31 | 15.25 | 12.05 | 10.02 | 3.77E−05 |
| | 200.34 | 77.17 | 101.11 | 24.10 | 18.11 | 15.77 | 10.82 | 7.018 | 0.17948 |
| | 206.54 | 68.58 | 106.09 | 23.02 | 18.90 | 14.37 | 13.62 | 9.14 | 5.03E−07 |
| | 223.78 | 109.17 | 127.88 | 17.24 | 16.38 | 15 | 12.7 | 9.03 | 1.13E−06 |
| | 233.79 | 133.55 | 129.19 | 20.05 | 18.70 | 16.53 | 14.52 | 10.05 | 0.01187 |

TABLE 5

FRR Calculation for User 1

| MDH | | | | | | | | ATH | | |
|---|---|---|---|---|---|---|---|---|---|---|
| 11.40 | 9.56 | 11.57 | 10.90 | 15.43 | 20.30 | 10.23 | 10.40 | 50.50 | 45.30 | 4.02 |
| 11.57 | 11.40 | 13.75 | 11.57 | 12.91 | 17.61 | 8.72 | 12.24 | 50 | 44.46 | 5.36 |
| 10.99 | 17.59 | 9.13 | 8.79 | 12.18 | 21.65 | 7.27 | 12.18 | 48.73 | 43.99 | 7.10 |
| 12.88 | 14.40 | 11.32 | 7.71 | 13.89 | 21.26 | 7.20 | 11.14 | 50.6 | 38.59 | 10.63 |
| 11.32 | 10.79 | 12.38 | 7.96 | 14.51 | 20.70 | 10.97 | 11.15 | 48.31 | 36.63 | 14.86 |
| 12.92 | 8.16 | 17.51 | 10.88 | 13.77 | 16.15 | 9.88 | 10.54 | 51.53 | 39.79 | 8.50 |

TABLE 5-continued

FRR Calculation for User 1

| | | | | | | | | | |
|---|---|---|---|---|---|---|---|---|---|
| 7.87 | 10.78 | 6.39 | 6.16 | 12.84 | 26.37 | 10.78 | 16.61 | 48.97 | 39.04 | 11.81 |
| 13.68 | 10.68 | 6.67 | 6.17 | 12.52 | 29.71 | 5.50 | 14.85 | 49.08 | 47.74 | 3.01 |
| 12.79 | 15.32 | 8.58 | 8.82 | 16.33 | 17.84 | 6.58 | 11.44 | 50.16 | 43.77 | 5.89 |
| 12 | 9.833 | 11.5 | 7.83 | 11.5 | 22.66 | 8.5 | 16 | 49.16 | 48.83 | 1.83 |
| 12.70 | 10.38 | 8.86 | 5.51 | 16.22 | 20.06 | 8.88 | 17.22 | 50.83 | 47.49 | 1.50 |
| 8.48 | 12.31 | 10.48 | 6.98 | 9.81 | 29.61 | 4.99 | 17.13 | 48.41 | 49.58 | 1.83 |
| 10.41 | 15.79 | 8.85 | 8.85 | 13.88 | 21.18 | 8.50 | 12.32 | 50.69 | 40.97 | 8.15 |
| 12 | 10.33 | 10.33 | 9.68 | 13.66 | 21.33 | 6.83 | 15.65 | 50.33 | 46.66 | 2.83 |
| 10.2 | 11.84 | 11.11 | 9.47 | 14.39 | 19.85 | 8.74 | 14.20 | 47.17 | 30.60 | 22.04 |
| 11.40 | 9.58 | 11.57 | 10.90 | 15.43 | 20.30 | 10.23 | 10.40 | 50.50 | 45.30 | 4.02 |
| 11.57 | 11.40 | 13.75 | 11.57 | 12.91 | 17.61 | 8.72 | 12.24 | 50 | 44.48 | 5.36 |
| 10.99 | 17.59 | 9.13 | 8.79 | 12.18 | 21.65 | 7.27 | 12.18 | 48.73 | 43.99 | 7.10 |
| 12.86 | 14.40 | 11.32 | 7.71 | 13.89 | 21.26 | 7.20 | 11.14 | 50.8 | 38.59 | 10.63 |
| 11.32 | 10.79 | 12.38 | 7.96 | 14.51 | 20.70 | 10.97 | 11.15 | 48.31 | 36.63 | 14.86 |
| 12.92 | 8.16 | 17.51 | 10.88 | 13.77 | 16.15 | 9.88 | 10.54 | 51.53 | 39.79 | 8.50 |
| 7.87 | 10.78 | 8.39 | 6.16 | 12.84 | 26.37 | 10.78 | 16.61 | 48.97 | 39.04 | 11.81 |
| 13.68 | 10.68 | 8.67 | 6.17 | 12.52 | 29.71 | 5.50 | 14.85 | 49.08 | 47.74 | 3.01 |
| 12.79 | 15.32 | 8.58 | 8.92 | 16.33 | 17.84 | 8.58 | 11.44 | 50.16 | 43.77 | 5.89 |
| 12 | 9.833 | 11.5 | 7.83 | 11.5 | 22.68 | 8.5 | 16 | 49.16 | 48.83 | 1.83 |
| 12.70 | 10.36 | 8.86 | 5.51 | 16.22 | 20.06 | 8.88 | 17.22 | 50.83 | 47.49 | 1.50 |
| 8.48 | 12.31 | 10.48 | 6.98 | 9.81 | 29.61 | 4.99 | 17.13 | 48.41 | 49.58 | 1.83 |
| 10.41 | 15.79 | 8.85 | 8.85 | 13.88 | 21.18 | 8.50 | 12.32 | 50.69 | 40.97 | 8.15 |
| 12 | 10.33 | 10.33 | 9.68 | 13.66 | 21.33 | 6.83 | 15.68 | 50.33 | 48.68 | 2.83 |
| 10.2 | 11.84 | 11.11 | 9.47 | 14.39 | 19.85 | 8.74 | 14.20 | 47.17 | 30.60 | 22.04 |

| ATA | | | MSD | | | | | CR |
|---|---|---|---|---|---|---|---|---|
| 105.54 | 32.22 | 72.33 | 24.46 | 20.10 | 15.64 | 9.56 | 5.61 | 100 |
| 104.94 | 37.78 | 54.12 | 23.21 | 16.18 | 14.58 | 10.02 | 5.44 | 100 |
| 77.69 | 25.87 | 71.42 | 27.20 | 24.05 | 19.28 | 12.88 | 5.50 | 97.19 |
| 102.64 | 24.99 | 91.80 | 32.15 | 19.35 | 13.07 | 10.21 | 6.08 | 100 |
| 122.61 | 32.13 | 83.38 | 28.14 | 20.97 | 15.69 | 10.92 | 7.00 | 100 |
| 82.79 | 27.98 | 37.44 | 17.89 | 17.85 | 16.64 | 12.38 | 6.68 | 97.19 |
| 90.32 | 19.03 | 60.05 | 27.12 | 22.01 | 17.07 | 12.38 | 8.95 | 97.19 |
| 57.88 | 24.35 | 30.88 | 25.01 | 13.61 | 12.92 | 10.73 | 5.44 | 97.19 |
| 113.93 | 28.92 | 49.6 | 24.07 | 24.04 | 11.26 | 11.20 | 5.65 | 100 |
| 73.85 | 26.58 | 50.18 | 16.55 | 16.55 | 9.28 | 8.46 | 5.11 | 97.19 |
| 76.65 | 31.83 | 7.55 | 12.38 | 12.19 | 11.68 | 9.92 | 5.25 | 97.19 |
| 48.50 | 25.93 | 6.18 | 18.37 | 18.27 | 17.97 | 10.24 | 4.65 | 97.19 |
| 97.65 | 32.16 | 67.23 | 14.97 | 15.29 | 14.94 | 11.76 | 6.93 | 100 |
| 71.68 | 27.05 | 23.76 | 33.88 | 21.76 | 11.84 | 9.32 | 5.31 | 97.19 |
| 121.98 | 35.47 | 93.55 | 19.22 | 19.23 | 14.18 | 12.53 | 5.61 | 100 |
| 105.54 | 32.22 | 72.33 | 24.48 | 20.10 | 15.64 | 9.56 | 5.61 | 100 |
| 104.94 | 37.78 | 54.12 | 23.21 | 16.18 | 14.58 | 10.02 | 5.44 | 100 |
| 77.69 | 25.87 | 71.42 | 27.20 | 24.05 | 19.28 | 12.88 | 5.50 | 97.19 |
| 102.64 | 24.99 | 91.80 | 32.15 | 19.35 | 13.07 | 10.21 | 6.08 | 100 |
| 122.61 | 32.13 | 83.38 | 28.14 | 20.97 | 15.69 | 10.92 | 7.00 | 100 |
| 82.79 | 27.98 | 37.44 | 17.89 | 17.95 | 16.64 | 12.38 | 6.68 | 97.19 |
| 90.32 | 19.03 | 60.05 | 27.12 | 22.01 | 17.07 | 12.38 | 8.95 | 97.19 |
| 57.88 | 24.35 | 30.88 | 25.01 | 13.61 | 12.92 | 10.73 | 5.44 | 97.19 |
| 113.93 | 28.92 | 49.6 | 24.07 | 24.04 | 11.26 | 11.20 | 5.65 | 100 |
| 73.85 | 26.58 | 50.18 | 16.55 | 16.55 | 9.28 | 8.46 | 5.11 | 97.19 |
| 76.65 | 31.83 | 7.55 | 12.38 | 12.19 | 11.68 | 9.92 | 5.25 | 97.19 |
| 48.50 | 25.93 | 6.18 | 18.37 | 18.27 | 17.97 | 10.24 | 4.55 | 97.19 |
| 97.65 | 32.16 | 67.23 | 14.97 | 15.29 | 14.94 | 11.76 | 6.93 | 100 |
| 71.68 | 27.05 | 23.76 | 33.98 | 21.76 | 11.84 | 9.32 | 5.31 | 97.19 |
| 121.98 | 35.47 | 93.55 | 19.22 | 19.23 | 14.18 | 12.53 | 5.61 | 100 |

In the experiment described above, we gave total freedom to the participants about which operating environments to use. As a consequence, data were collected using a variety of hardware and software systems. Questions remained about the impact of these variables on the results obtained. For example, what if the perceived difference between the MDS of two different users was simply due to the fact they were using different software applications?

In order to answer these questions, we conducted a small experiment where seven different users were asked to perform the same set of actions using the same machine. More specifically, we developed a fixed user interface for the experiment where each user is asked to perform a specific action between two rectangles. The process was repeated 100 times per user session. In each round the program forces the user to perform the action in a specific direction by changing the position of both rectangles; the distances between the boxes are equal. The software records the time the user consumes to perform the action. All environment variables were fixed in this experiment.

The first null hypothesis we wanted to prove is that for a mouse signature factor if all other environment variables are fixed then similar user behavior is observed. Table 6 shows seven different sessions for the same user performing drag and drop in the eight recognized directions. The time shown is the average time required to perform the action in milliseconds. In order to emphasize on the similarity of the readings we calculate chi-square for the recorded sessions. We use the $1^{st}$ session as the expected frequency in the chi-square test. Since we were comparing 8 proportions the number of degrees of freedom is 7; for this number we have $\chi_{0.01}^2 = 18.475$. From table 6 we noticed that most of the calculated values are lower than this value (only one result is slightly above the limit), which means that the first null hypothesis is true.

TABLE 6

Comparing drag-drop sessions for the same user

| 1 | 2 | 3 | 4 | 5 | 6 | 7 | 8 | Avg. | $\chi^2$ |
|---|---|---|---|---|---|---|---|---|---|
| 115.79 | 98.33 | 79.01 | 116.41 | 96.52 | 84.41 | 103.56 | 86.62 | 112.47 | 0 |
| 105.35 | 95.71 | 65.92 | 101.8 | 101.63 | 74.12 | 94.66 | 80.87 | 103.59 | 7.68 |
| 100.93 | 88.92 | 72.50 | 111.5 | 101 | 83.92 | 93.2 | 79.14 | 104.52 | 5.44 |
| 126.04 | 104.28 | 76.68 | 125.11 | 113.35 | 119.64 | 111.93 | 92.41 | 123.71 | 20.68 |
| 119 | 99.44 | 72.97 | 123.33 | 104.58 | 95.80 | 98.70 | 95.89 | 115.13 | 4.4 |
| 107.87 | 84.01 | 75.63 | 116.62 | 104 | 80.89 | 105.43 | 82.67 | 108.96 | 3.71 |
| 121.8 | 93.96 | 82.18 | 121.33 | 108.52 | 89.01 | 128.47 | 83.83 | 120.33 | 8.66 |

The second null hypothesis we wanted to prove is that there is detectable difference between different users, which does not depend on other environment variables like hardware and software configuration. Table 7 shows seven sessions for seven different users; we use the $1^{st}$ user session as the expected frequency. Chi Square is calculated for the other six users. The results shown indicate significant differences in the compared frequencies proving the second null hypothesis.

TABLE 7

Drag-drop sessions for seven different users

| User | 1 | 2 | 3 | 4 | 5 | 6 | 7 | 8 | Avg. | $\chi^2$ |
|---|---|---|---|---|---|---|---|---|---|---|
| User 1 | 106.81 | 137.58 | 77.09 | 128.62 | 110.87 | 121.69 | 146.6 | 74.48 | 127.13 | 0 |
| User 2 | 105.35 | 95.71 | 65.92 | 101.8 | 101.63 | 74.12 | 94.66 | 80.87 | 103.59 | 58.28 |
| User 3 | 95.76 | 89.28 | 65.15 | 103 | 97.23 | 82.14 | 122.52 | 73.74 | 104.23 | 43.54 |
| User 4 | 187.7 | 142.32 | 137.76 | 212.5 | 196.87 | 148.92 | 208.87 | 153.75 | 200.16 | 347.49 |
| User 5 | 91.31 | 138.87 | 90.71 | 135 | 81.28 | 85.61 | 84.46 | 67.14 | 108.54 | 60.64 |
| User 6 | 122 | 95.44 | 83.65 | 117.62 | 120.06 | 88.74 | 145.06 | 115.40 | 127.9 | 48.74 |
| User 7 | 100.73 | 84.76 | 63.84 | 107.44 | 112.83 | 88.17 | 108.88 | 73.80 | 105.99 | 45.36 |

Keystroke Dynamics

Table 8 shows a combination of tri-graphs generated from three sessions for two different users, and the corresponding time used to perform the tri-graphs in milliseconds. The tri-graphs shown are centered by the character 'a' (ASCII code 65). From the table we can notice the similarity between the response time for the first user's sessions, we can also notice obvious difference in behavior between the two users which can easily be detected for some of the tri-graphs (marked in bold).

TABLE 8

Time used to perform different tri-graphs for two different users

| Tri-graph ASCII Code | User 1 Session 1 | User 1 Session 2 | User 2 |
|---|---|---|---|
| 87-65-68 | 86 | 85 | 73 |
| 83-65-89 | 83 | 82 | 69 |
| 77-65-78 | 76 | 70 | 60 |
| 70-65-69 | 134 | 112 | 62 |
| 82-65-72 | 122 | 92 | 80 |
| 77-65-78 | 74 | 76 | 68 |
| 87-65-68 | 80 | 81 | 71 |
| 83-65-89 | 71 | 75 | 111 |
| 83-65-76 | 62 | 62 | 59 |
| 83-65-76 | 67 | 64 | 63 |
| 76-65-77 | 143 | 205 | 56 |

In access control applications the extracted group of digraphs and tri-graphs are pre-defined since the user is asked to enter a paragraph containing them. In intrusion detection applications, however, this scenario is not applicable.

Detecting the behavior from an unexpected set of digraphs requires large amount of data to be collected in the enrollment mode so as to cover a higher percentage of the captured data in the verification mode.

Our goal was to design a detection algorithm that generates a Keystroke Dynamics Signature or KDS, which could be used as a reference user profile and matched against active user profiles to dynamically detect masqueraders.

We propose two different approaches to construct the KDS, a digraph based approach which utilizes a single neural network per user, and a key oriented neural network based approach, where a neural network is trained for each keyboard key to best simulate its usage dynamics with reference to other keys. We also propose a technique which can be used to approximate a tri-graph value based on other detected tri-graphs and the locations of the keys with reference to each other, aiming to minimize the failure to compare ratio (FTC) and to speed up the user enrollment process.

The first approach we propose is a digraph based analysis approach. The approach utilizes a neural network to simulate the user behavior based on the detected digraphs. The neural network (FIG. 20) used for this approach is a feed forward multi layer perceptron network. The training algorithm is back propagation. The network consists of four layers, input layer, two hidden layers, and a single node output layer.

The input layer consists of N number of nodes where N=2×Number of Monitored Keyboard keys. Input to the nodes is binary 0 or 1, as each node in the input layer represents a key. The $1^{st}$ N nodes represents the key where the action is started at, and the $2^{nd}$ N nodes represent the key where the action ends. Each batch of nodes should have only one input set to one while the other inputs are set to 0; the node set to 1 represents the selected key.

During the enrollment mode, a batch of M actions will be collected and fed to the behavior modeling neural network as a training data. The factor M representing the number of actions used for enrollment will be determined based on another factor D which represents the percentage coverage of the collected digraphs combinations during the data collection process. When this percentage reaches a specific predefined limit, the collected data can be used for the enrollment process.

A simulation will run after the neural network has been trained with this batch. This simulation will consist of a number of non redundant actions picked from the enrollment data. The result of this simulation will be stored for each user as well as the training data, which will be used also in the verification stage.

A small batch of actions will be used in this stage to verify the user identity; this batch will be added to the training batch of the user's neural network, resulting a network with different weights. The effect of the small batch on the network weights represent a deviation from the enrollment network. In order to measure this deviation, another simulation will run on this network with the same batch prepared for the enrollment process for the specific user. By comparing the result of this simulation to the enrollment stage result, the deviation can be specified. An approach that can be used here is to calculate the sum of the absolute difference of the two results, if this deviation is low (within a specific limit) then the collected sample is for the same user, if not then this sample is for another user.

Our second proposed approach is based on tri-graph analysis, we name this approach as "Key Oriented" approach because it is based on assigning a neural network for each monitored key on the keyboard. The neural network used in this approach is similar to the one described in the previous section. The training procedure requires passing the tri-graph start key, end key, and the elapsed time to the network. FIG. 21 gives an example of how multi network is utilized in the enrollment or detection phases.

Coverage matrix is a three dimensional matrix which is used to store the number of occurrences of the observed tri-graphs in the enrollment mode. Keeping track of such information helps in different areas such as in evaluating the overall coverage of the enrollment process and the development of a customized enrollment scenario which can be used in case of low coverage. It also helps in the approximation technique which is explained in the next section.

In order to develop a technique to help in minimizing the amount of data needed for the enrollment process, the needed information from the information detected so far should be extracted.

Approximation matrix, which is a two dimensional matrix, represents the relations between the keys and how close or far they are from each other. The matrix will be initialized with numbers representing the actual distances between the keys on the keyboard.

FIG. 22 illustrates how the approximation process is performed. Lets assume that an approximation for the EB digraph is needed, we can detect that directly from its corresponding value in the coverage matrix (FIG. 22b). The approximation matrix will be used to locate alternative entries (for each key) which have the lowest distance in the matrix; in this case it will be (D,H) and (G,F) respectively.

From this step we can enumerate the tentative approximations, in this case it is DG, DH, FG, and FH. In the next step the distance of each combination will be calculated from the approximation matrix (underlined numbers in FIG. 22a), where they will be sorted according to their closeness to the original distance of the approximated digraph (AppMatrix (EB)=3). The sorted result is (FH, DG, DH, FG).

The Coverage matrix may be used to make the final decision out of the sorted result. The matrix in FIG. 22b shows only the weights of the tentative combinations. Notice that digraph FH has a coverage of 30 which means that it is a good candidate (the best fit in this case). The second alternative DG also has good coverage, while DH's has a relatively low coverage.

The invention claimed is:

1. A behavioral biometric-based user verification system for use with a mouse input device, said system comprising:
a data interception unit configured to intercept inputs from a user that are directed to an in-focus application other than a user authentication application not in focus, wherein the data interception unit is configured to passively collect at least one of mouse movement data, mouse point and click data, and mouse drag and drop data generated in response to usage of the mouse in providing input to the in-focus application other than the user authentication application;
a behavior analysis unit operatively coupled to said data interception unit to receive the passively collected mouse data, and
a behavior comparison unit operatively coupled to said behavior analysis unit, wherein said system dynamically monitors and passively collects behavioral biometric information, and translates said behavioral biometric information into representative data, stores and compares different results, and outputs a user identity result associated with authorization of the user.

2. The user verification system of claim 1, wherein said system is suitably configured for real-time monitoring.

3. The user verification system of claim 2, further comprising secure communication protocols operatively coupled to said data interception unit.

4. The user verification system of claim 1, wherein said data interception unit is configured to identify data based on mouse movement between first and second locations, wherein movement between the first and second locations is not associated with a mouse click.

5. The user verification system of claim 4, wherein said data interception unit is further configured to characterize movement based on at least one of average speed, average travelled distance, and direction of movement.

6. The verification system of claim 1, wherein said data interception unit is further configured to identify action from a mouse as one of drag and drop, point and click, mouse movement, and silence such that in use, said system receives data from a mouse.

7. The user verification system of claim 6, wherein said data interception unit is further configured to characterize mouse movement based on at least one of average speed, average traveled distance, and direction of movement.

8. The system of claim 1, wherein the behavior comparison unit is configured to store user identities for a plurality of potential users, and the user identity result identifies the user from among the plurality of potential users.

9. The system of claim 1, wherein the behavior comparison unit is configured to produce the user identity result based on mouse movement speed compared to traveled distance, average speed per direction of movement, a distribution of movement directions, average speed with respect to action type, a distribution of actions, a distribution of traveled distance, and a distribution of movement elapsed time.

10. The system of claim 1, wherein the behavior analysis unit is configured to establish a user signature based on a plurality of sessions in an enrollment mode.

11. A method of characterizing a user comprising the steps of:
  receiving at least one of mouse movement data, mouse point and click data, and mouse drag and drop data associated with movement of a computer mouse in supplying data to an in-focus user application other than an authentication application not in focus;
  forwarding the received data to the user application;
  passively intercepting at least a portion of the received data and forwarding the intercepted portion to a behavioral processing unit; and
  processing the intercepted portion so as to develop a signature for a user.

12. The method of claim 11, further comprising comparing said signature with a signature of an authorized user.

13. The method of claim 12, further comprising filtering said data after processing and before developing the signature to reduce noise.

14. The method of claim 13, further comprising, processing said data, and developing the signature in real-time.

15. The method of claim 11, further comprising characterizing mouse movement based on at least one of average speed, average traveled distance, and direction of movement.

16. The method of claim 11, wherein the signature for the user is developed based on movement speed compared to traveled distance, average speed per direction of movement, distribution of movement directions, average speed with respect to action type, a distribution of actions, a distribution of traveled distance, and a distribution of movement elapsed time.

17. The method of claim 11, wherein the passively collected behavioral biometric data is based on mouse movement between first and second locations, wherein movement between the first and second locations is not associated with a mouse click.

18. The method of claim 11, wherein the behavioral biometric information from the mouse is obtained in a background process.

19. The method of claim 11, wherein the signature for the user is developed based on a distribution of traveled distances.

20. The method of claim 11, wherein the passively collected mouse data includes mouse movement data.

21. The method of claim 11, wherein the passively collected mouse data includes mouse point and click data.

22. The method of claim 11, wherein the passively collected mouse data includes drag and drop data.

23. A behavioral biometric-based user verification system for use with a mouse input device, said system comprising:
  a data interception unit configured to intercept inputs from a user that are directed to an in-focus user application other than an authentication application not in focus, wherein the data interception unit is configured to passively initiate collection of at least one of mouse movement data, mouse point and click data, and mouse drag and drop data;
  a behavior analysis unit operatively coupled to said data interception unit to receive the passively collected mouse data; and
  a behavior comparison unit operatively coupled to said behavior analysis unit, wherein said system dynamically monitors and passively collects behavioral biometric information based on the passively collected mouse data, and translates said behavioral biometric information into representative data, stores and compares different results, and outputs a user identity result.

24. A behavioral biometric-based user verification system for use with a mouse input device, said system comprising:
  a data interception unit for receiving inputs from a user that are directed to an in-focus user application other than an authentication application not in focus, wherein the data interception unit is configured to transparently collect at least one of mouse movement data, mouse point and click data, and mouse drag and drop data generated in response to the user;
  a behavior analysis unit operatively coupled to said data interception unit to receive the transparently collected mouse data; and
  a behavior comparison unit operatively coupled to said behavior analysis unit, wherein said system dynamically monitors and passively collects behavioral biometric information, and translates said behavioral biometric information into representative data, stores and compares different results, and outputs a user identity result.

* * * * *

UNITED STATES PATENT AND TRADEMARK OFFICE
CERTIFICATE OF CORRECTION

PATENT NO.      : 8,230,232 B2
APPLICATION NO. : 10/555408
DATED           : July 24, 2012
INVENTOR(S)     : Ahmed El-Sayed Ahmed et al.

It is certified that error appears in the above-identified patent and that said Letters Patent is hereby corrected as shown below:

In the Specification:

Column 1, line 26, "worn" should read --worm--.

Column 8, line 9, "client server" should read --client/server--.

Column 8, lines 49-50, "by, observation" should read --by observation--.

Column 11, line 29, "mapping off with n" should read --mapping of f with n--.

Column 17, Table 3, "8.51" should read --8.61--.

Column 17, Table 3, "8.98" should read --8.96--.

Column 18, Table 3, "9.98" should read --9.96--.

Column 18, Table 3, "6.68" should read --6.88--.

Column 18, Table 3, "15.38" should read --15.36--.

Column 18, Table 3, "22.68" should read --22.88--.

Column 18, Table 3, "38.30" should read --36.30--.

Column 19, Table 3, "198.32" should read --196.32--.

Column 19, Table 3, "19.55" should read --19.65--.

Column 19, Table 3, "18.66" should read --18.68--.

Column 19, Table 3, "18.24" should read --16.24--.

Column 19, Table 3, "18.46" should read --16.46--.

Column 19, Table 4, "8.59" should read --8.58--.

Column 19, Table 4, "7.64" should read --7.54--.

Column 19, Table 4, "15.28" should read --15.26--.

Column 19, Table 4, "9.61" should read --9.51--.

Column 19, Table 4, "16.68" should read --16.66--.

Column 19, Table 4, "16.51" should read --18.51--.

Signed and Sealed this
Second Day of August, 2016

Michelle K. Lee
*Director of the United States Patent and Trademark Office*

CERTIFICATE OF CORRECTION (continued)
U.S. Pat. No. 8,230,232 B2

Column 19, Table 4, "52.62" should read --52.82--.

Column 19, Table 4, "216.92" should read --216.86--.

Column 19, Table 4, "58.125" should read --86.125--.

Column 19, Table 4, "138.49" should read --136.49--.

Column 19, Table 4, "18.18" should read --18.16--.

Column 19, Table 4, "16.43" should read --18.43--.

Column 19, Table 4, "16.38" should read --16.36--.

Column 19, Table 4, "17.68" should read --17.88--.

Column 19, Table 4, "10.82" should read --10.92--.

Column 19, Table 4, "0.17948" should read --0.17946--.

Column 19, Table 4, "12.88" should read --12.86--.

Column 21, Table 5, "10.38" should read --10.36--.

Column 21, Table 5, "6.38" should read --8.39--.

Column 21, Table 5, "8.67" should read --6.67--.

Column 21, Table 5, "8.82" should read --8.92--.

Column 21, Table 5, "9.68" should read --9.66--.

Column 21, Table 5, "9.88" should read --9.86--.

Column 21, Table 5, "6.58" should read --8.58--.

Column 21, Table 5, "8.88" should read --8.86--.

Column 21, Table 5, "15.65" should read --15.66--.

Column 21, Table 5, "15.68" should read --15.66--.

Column 21, Table 5, "50.8" should read --50.6--.

Column 21, Table 5, "46.66" should read --48.66--.

Column 21, Table 5, "44.48" should read --44.46--.

Column 21, Table 5, "48.68" should read --48.66--.

Column 21, Table 5, "57.88" should read --57.86--.

Column 21, Table 5, "71.68" should read --71.66--.

Column 21, Table 5, "121.98" should read --121.96--.

Column 21, Table 5, "33.88" should read --33.98--.

Column 21, Table 5, "24.48" should read --10.36--.

Column 21, Table 5, "17.85" should read --10.36--.

Column 21, Table 5, "12.88" should read --10.36--.

Column 21, Table 5, "8.95" should read --10.36--.

Column 21, Table 5, "4.65" should read --10.36--.

CERTIFICATE OF CORRECTION (continued)
U.S. Pat. No. 8,230,232 B2

Column 23, Table 8, "70-65-69" should read --70-65-69--.

Column 23, Table 8, "134" should read --134--.

Column 23, Table 8, "112" should read --112--.

Column 23, Table 8, "62" should read --62--.

Column 23, Table 8, "83-65-89" should read --83-65-89--.

Column 23, Table 8, "71" should read --71--.

Column 23, Table 8, "75" should read --75--.

Column 23, Table 8, "111" should read --111--.

Column 23, Table 8, "76-65-67" should read --76-65-67--.

Column 23, Table 8, "143" should read --143--.

Column 23, Table 8, "205" should read --205--.

Column 23, Table 8, "56" should read --56--.